US012379570B2

(12) United States Patent
Yu et al.

(10) Patent No.: US 12,379,570 B2
(45) Date of Patent: Aug. 5, 2025

(54) OPTICAL ELEMENT DRIVING MECHANISM

(71) Applicant: TDK TAIWAN CORP., Taoyuan (TW)

(72) Inventors: Chen-Yu Yu, Taoyuan (TW); Shou-Jen Liu, Taoyuan (TW); Shao-Chung Chang, Taoyuan (TW); Shih-Wei Hung, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 851 days.

(21) Appl. No.: 17/541,760

(22) Filed: Dec. 3, 2021

(65) Prior Publication Data
US 2022/0179167 A1    Jun. 9, 2022

Related U.S. Application Data

(60) Provisional application No. 63/137,968, filed on Jan. 15, 2021, provisional application No. 63/121,415, filed on Dec. 4, 2020.

(51) Int. Cl.
*G02B 7/09*  (2021.01)
*G02B 27/64* (2006.01)
*H02K 41/035* (2006.01)

(52) U.S. Cl.
CPC ............. *G02B 7/09* (2013.01); *G02B 27/646* (2013.01); *H02K 41/0354* (2013.01)

(58) Field of Classification Search
CPC ...... G02B 27/646; G02B 6/3514; G02B 7/08; G02B 7/09; G02B 7/182; G02B 15/173; G02B 15/14; G02B 15/177; G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163;
(Continued)

(56) References Cited

U.S. PATENT DOCUMENTS

2020/0213493 A1* 7/2020 Cheng .................. H04N 23/54
2021/0364733 A1* 11/2021 Lee ..................... G03B 13/36

FOREIGN PATENT DOCUMENTS

CN          213750475 U      7/2021

OTHER PUBLICATIONS

Office Action issued on Mar. 15, 2022 for the corresponding Application No. 202123024880.0 in China.

* cited by examiner

*Primary Examiner* — Stephone B Allen
*Assistant Examiner* — Tamara Y. Washington
(74) *Attorney, Agent, or Firm* — MUNCY, GEISSLER, OLDS & LOWE, P.C.

(57) ABSTRACT

An optical element driving mechanism is provided. The optical element driving mechanism includes a movable portion, a fixed portion, a driving assembly, and a circuit assembly. The movable portion is used for connecting to a first optical element. The movable portion is movable relative to the fixed portion. The driving assembly is used for driving the movable portion to move relative to the fixed portion. The circuit assembly is electrically connected to the driving assembly. The driving assembly is electrically connected to an external circuit through the circuit assembly.

17 Claims, 29 Drawing Sheets

(58) Field of Classification Search
CPC ........ G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08; G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; H04N 5/23287; H04N 5/2252; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; H04N 5/23261; H04N 5/23274; H04N 5/238; H04N 23/58; H04N 23/687; H04N 23/55; G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092; H02K 41/0356

See application file for complete search history.

OPTICAL ELEMENT DRIVING MECHANISM

CROSS REFERENCE TO RELATED APPLICATIONS

This application claims the benefit of U.S. Provisional Application No. 63/121,415, filed on Dec. 4, 2020, and U.S. Provisional Application No. 63/137,968, filed on Jan. 15, 2021, the entirety of which are incorporated by reference herein.

BACKGROUND OF THE INVENTION

Field of the Invention

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choice to consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue.

BRIEF SUMMARY OF THE INVENTION

An optical element driving mechanism is provided. The optical element driving mechanism includes a movable portion, a fixed portion, a driving assembly, and a circuit assembly. The movable portion is used for connecting to a first optical element. The movable portion is movable relative to the fixed portion. The driving assembly is used for driving the movable portion to move relative to the fixed portion. The circuit assembly is electrically connected to the driving assembly. The driving assembly is electrically connected to an external circuit through the circuit assembly.

In some embodiments, the fixed portion includes a case, a bottom, and a frame. The case includes a first top wall and a first side wall. The bottom and the case form an accommodating space, and the movable portion is disposed in the accommodating space wherein the material of the frame includes metal. The first top wall is perpendicular to a main axis. The material of the case includes metal. The materials of the case and the frame are different. The frame is disposed in the accommodating space. The magnetic conductivity of the frame is higher than the magnetic conductivity of the case. The frame includes a second top wall and a second side wall. The first top wall and the second top wall are parallel. The first side wall and the second side wall are parallel. The case further includes a first bending portion, and the first top wall connects to the first side wall through the first bending portion. The frame further includes a second bending portion, and the second top wall connects to the second side wall through the first bending portion. A first opening is formed between the second top wall and the second side wall. A second opening is formed between the second top wall and the second side wall. The second bending portion is between the first opening and the second opening. When viewed along the main axis, the optical element driving mechanism is polygonal, and the first side wall is at a first side of the optical element driving mechanism. When viewed along the main axis, the second side wall is at the first side. When viewed along the main axis, the second top wall is at the first side. The shortest distance between the first top wall and the second top wall is greater than the shortest distance between the first side wall and the second side wall. When viewed along the main axis, at least a portion of the first bending portion overlaps the first opening. When viewed along the main axis, at least a portion of the first bending portion overlaps the second opening.

In some embodiments, the driving assembly includes a first magnetic element and a first coil corresponding to the first magnetic element. When viewed along the main axis, the first magnetic element is at the first side. The first magnetic element is affixed on the second side wall. The first magnetic element protrudes from the second side wall.

In some embodiments, the optical element driving mechanism further includes a first damping element used for absorbing abnormal vibration of the movable portion relative to the fixed portion, and a second damping element used for absorbing abnormal vibration of the movable portion relative to the fixed portion. When viewed along the main axis, the optical element driving mechanism further includes a second side adjacent to the first side, and a third side adjacent to the first side. The fixed portion further includes a first edge position at the first side, a second edge position at the second side, and a third edge position at the third side. The material of the first damping element includes nonmetal material. The material of the second damping element includes nonmetal material. The first side and the second side extend in directions that are perpendicular. The first side and the third side extend in directions that are perpendicular. When viewed along the main axis, a shortest distance between the first damping element and the second edge is different from a shortest distance between the first damping element and the first edge. When viewed along the main axis, a shortest distance between the second damping element and the third edge is different from a shortest distance between the second damping element and the first edge.

In some embodiments, the fixed portion further includes a first blocking wall extending along the main axis, a first stopping surface used for limiting the movement of the movable portion relative to the fixed portion, a first adhesive element, and a first connect reinforcement structure used for reinforcing the adhesion of the first adhesive element. The case is affixed on the bottom by the first adhesive element. When viewed along the main axis, the first blocking wall is at the second side. The first damping element is disposed on the first blocking wall. The first stopping surface is at the first blocking wall. The first blocking wall and the bottom are formed as one piece. The first connect reinforcement structure is at the first blocking wall. The first connect reinforcement structure is a recessed structure. When viewed along the main axis, the shortest distance between the first damping element and the second edge is less than the shortest distance between the first damping element and the first edge. When viewed along the main axis, the shortest distance between the second damping element and the third edge is less than the shortest distance between the second damping element and the first edge. The material of the first damping element includes resin, plastic, rubber, or silicone. The material of the second damping element includes resin, plastic, rubber, or silicone.

In some embodiments, the optical element driving mechanism further includes a position sensing assembly used for detecting the movement of the movable portion relative to the fixed portion. When viewed along the main axis, the position sensing assembly is at the second side. The circuit assembly includes a first circuit element electrically connected to the position sensing assembly. When viewed along the main axis, the first circuit element is at the second side. The first circuit element is affixed on the first blocking wall. The first circuit element is plate-shaped. The first blocking wall includes a first recess used for accommodating the position sensing assembly, a second recess used for accommodating the first circuit element, and a third recess used for accommodating a second adhesive element. The first recess is in the second recess. The first circuit element is affixed on the first blocking wall by the second adhesive element. The third recess is in the second recess. The depth of the first recess is greater than the depth of the third recess. When viewed along the main axis, the positon sensing assembly is at the center of the second side.

In some embodiments, the circuit assembly further includes a second circuit element disposed on the bottom. The first circuit element includes a first contact. The second circuit element includes a second contact. The optical element driving mechanism further includes a first electrical connecting element. The first contact is electrically connected to the second contact by the first electrical connecting element. The first electrical connecting element is in direct contact with a first surface of the first circuit element. The first electrical connecting element is in direct contact with a second surface of the second circuit element. The first surface and the second surface are not parallel. When viewed along a first direction that is perpendicular to the main axis, the first surface at least partially overlaps the second surface in a second direction that is perpendicular to the main axis. When viewed along the first direction, the first surface does not overlap a third surface of the second contact in the second direction. The second surface and the third surface face opposite directions. At least a portion of the second surface overlaps the third surface in the direction that the main axis extends.

In some embodiments, the circuit assembly further includes a third circuit element electrically connected to the second circuit element. The movable portion is movable connected to the fixed portion through the third circuit element. The driving assembly is electrically connected to the second circuit element through the third circuit element. The third circuit element is plate-shaped. The third circuit element includes a third contact and a fourth contact electrically connected to the second circuit element. When viewed along the main axis, the third contact and the fourth contact are position at the diagonal of the optical element driving mechanism. At least a portion of the second circuit element is embedded in the bottom and does not exposed from the bottom. The first surface and the second surface are perpendicular.

In some embodiments, the circuit assembly further includes a fourth circuit element electrically connected to the second circuit element. The movable portion is movably connected to the fixed portion through the fourth circuit element. The fourth circuit element is plate-shaped. The second circuit element includes a fifth contact and a sixth contact electrically connected to the fourth circuit element. When viewed along the main axis, the fifth contact and the sixth contact are position at the diagonal of the optical element driving mechanism. The fifth contact is at the first blocking wall. At least a portion of the second circuit is embedded in and does not exposed from the first blocking wall.

In some embodiments, the optical element driving mechanism further includes an optical unit used for adjusting light to the optical element. The optical unit includes a movable element used for connect to a light control unit, a base, and a driving element used for driving the movable element to move relative to the base. The movable element is movable relative to the base. The driving element is used for driving the movable element to move relative to the fixed portion and the movable portion. The base is affixed on the movable portion. The base is affixed to the optical element. The optical element includes a lens barrel and a lens affixed in the lens barrel. The material of the lens barrel includes plastic, and the material of the lens includes transparent material. The base is affixed on the lens barrel. A base surface of the base faces the optical element. A lens barrel surface of the lens barrel faces the base. The base surface and the lens barrel surface are parallel. A gap is between the base surface and the lens barrel surface. The optical unit is affixed on the movable portion. The optical unit is not in direct connect with the fixed portion. The driving element is electrically connected to the fourth circuit element. The fourth circuit element further includes a seventh contact electrically connected to the driving assembly. When viewed along the main axis, the seventh contact is exposed from the case. When viewed along the main axis, the seventh contact does not overlap the first top wall.

In some embodiments, the circuit assembly further includes a first external contact used for connecting to the external circuit, and a second external contact used for connecting to the external circuit. The first external contact is electrically connected to the driving assembly. The first external contact is electrical isolated from the optical unit. The first external contact is electrical isolated from the driving element. The second external contact is electrically connected to the driving assembly. The second external contact is electrically connected to the driving element. The external circuit provides a first signal to the first external contact, and the first signal includes alternative voltage or current. The external circuit provides a second signal to the second external contact, and the second signal includes constant voltage or current.

In some embodiments, the movable portion further includes a first positioning structure. The fixed portion further includes a second positioning structure corresponding to the first positioning structure. The third circuit element further includes a first positioning portion and a second positioning portion connected to the movable portion and the fixed portion through the first positioning structure and the second positioning structure, respectively. The optical element driving mechanism further includes a first adhesive structure disposed on the first positioning structure, and a second adhesive structure disposed on the second positioning structure. When viewed along the main axis, and before the third circuit element is disposed on the movable portion and the fixed portion, a first gap is between the first positioning structure and the second positioning structure. When viewed along the main axis, and after the third circuit element is disposed on the movable portion and the fixed portion, a second gap is between the first positioning structure and the second positioning structure. The first gap and the second gap are different and have a first difference.

In some embodiments, the movable portion further includes a third positioning structure, a fifth positioning structure, and a seventh positioning structure. The fixed portion further includes a fourth positioning structure, a sixth positioning structure, and an eighth positioning structure. The first positioning structure, the third positioning structure, the fifth positioning structure, and the seventh positioning structure correspond to the second positioning structure, the fourth positioning structure, the sixth positioning structure, and the eighth positioning structure, respectively. The third circuit element further includes a third positioning portion, a fourth positioning portion, a fifth positioning portion, a sixth positioning portion, a seventh positioning portion, and an eighth positioning portion corresponding to the third positioning structure, the fourth positioning structure, the fifth positioning structure, the sixth positioning structure, the seventh positioning structure, and the eighth positioning structure, respectively. When viewed along the main axis, and before the third circuit element is disposed on the movable portion and the fixed portion, a third gap is between the third positioning structure and the fourth positioning structure. When viewed along the main axis, and after the third circuit element is disposed on the movable portion and the fixed portion, a fourth gap is between the third positioning structure and the fourth positioning structure. When viewed along the main axis, and before the third circuit element is disposed on the movable portion and the fixed portion, a fifth gap is between the fifth positioning structure and the sixth positioning structure. When viewed along the main axis, and after the third circuit element is disposed on the movable portion and the fixed portion, a sixth gap is between the fifth positioning structure and the sixth positioning structure. When viewed along the main axis, and before the third circuit element is disposed on the movable portion and the fixed portion, a seventh gap is between the seventh positioning structure and the eighth positioning structure. When viewed along the main axis, and after the third circuit element is disposed on the movable portion and the fixed portion, an eighth gap is between the seventh positioning structure and the eighth positioning structure. The third gap and the fourth gap are different and have a second difference. The fifth gap and the sixth gap are different and have a third difference. The seventh gap and the eighth gap are different and have a fourth difference.

In some embodiments, the first positioning structure, the third positioning structure, the fifth positioning structure, and the seventh positioning structure position at different corners of the optical element driving mechanism. The second positioning structure, the fourth positioning structure, the sixth positioning structure, and the eighth positioning structure position at different corners of the optical element driving mechanism. The first difference is less than the second difference. The first difference is less than the third difference. The first difference equals to the fourth difference. The second difference equals to the third difference.

In some embodiments, the first positioning structure, the third positioning structure, the fifth positioning structure, and the seventh positioning structure position at different corners of the optical element driving mechanism. The second positioning structure, the fourth positioning structure, the sixth positioning structure, and the eighth positioning structure position at different corners of the optical element driving mechanism. The first difference is less than the second difference. The first difference is less than the third difference. The first difference is less than the fourth difference. The second difference is greater than the third difference. The second difference is greater than the fourth difference. The third difference is greater than the fourth difference.

In some embodiments, the first positioning structure, the third positioning structure, the fifth positioning structure, and the seventh positioning structure position at different sides of the optical element driving mechanism. The second positioning structure, the fourth positioning structure, the sixth positioning structure, and the eighth positioning structure position at different sides of the optical element driving mechanism. The first difference is greater than the second difference. The first difference equals to the third difference. The first difference is greater than the fourth difference. The second difference equals to the fourth difference.

In some embodiments, the first positioning structure, the third positioning structure, the fifth positioning structure, and the seventh positioning structure position at different sides of the optical element driving mechanism. The second positioning structure, the fourth positioning structure, the sixth positioning structure, and the eighth positioning structure position at different sides of the optical element driving mechanism. The first difference is greater than the second difference. The first difference is less than the third difference. The first difference is greater than the fourth difference. The second difference is less than the third difference. The second difference is greater than the third difference. The second difference is greater than the fourth difference.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
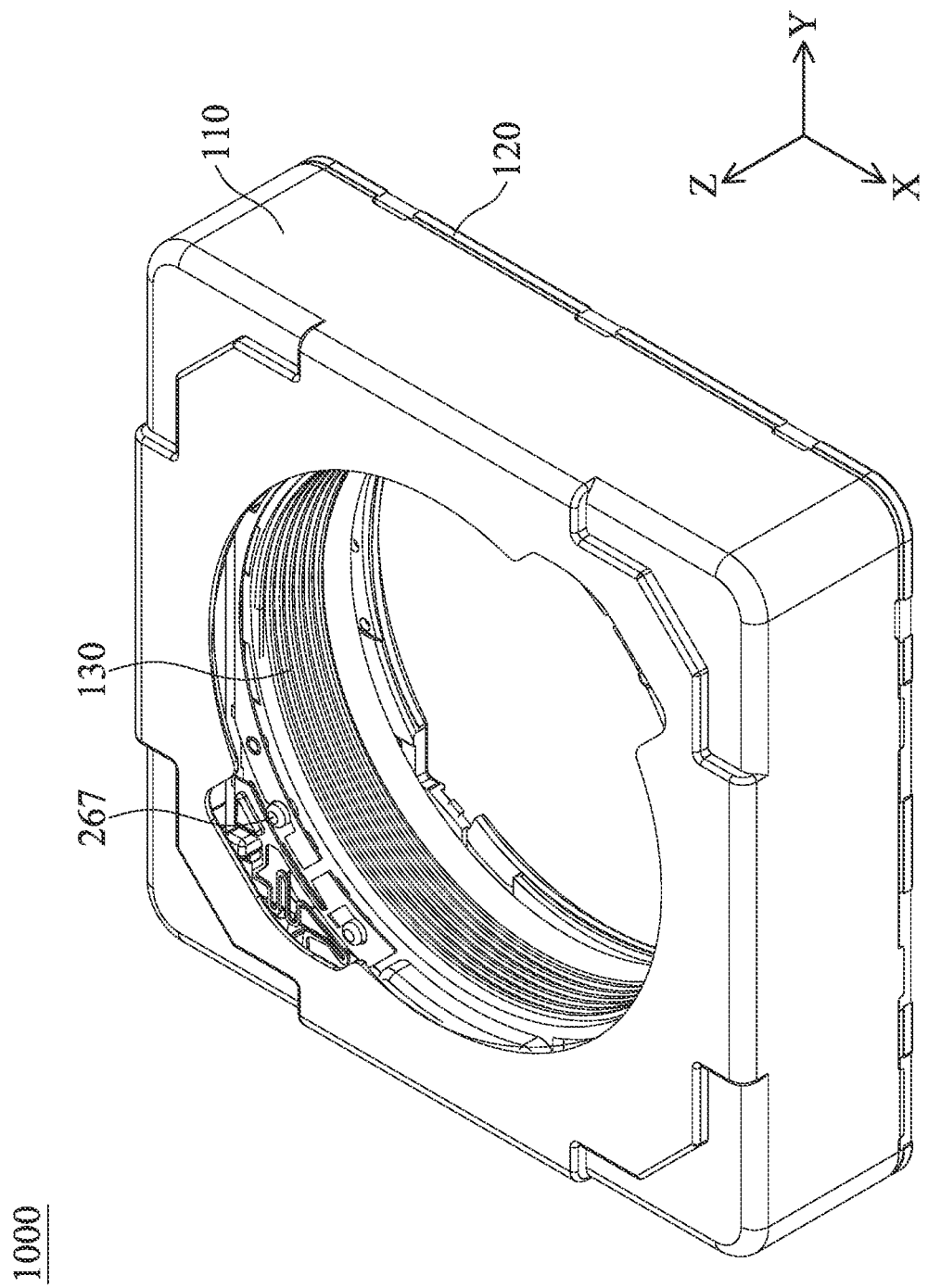
FIG. 1A is a schematic view of an optical element driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, in some embodiments, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 1B:
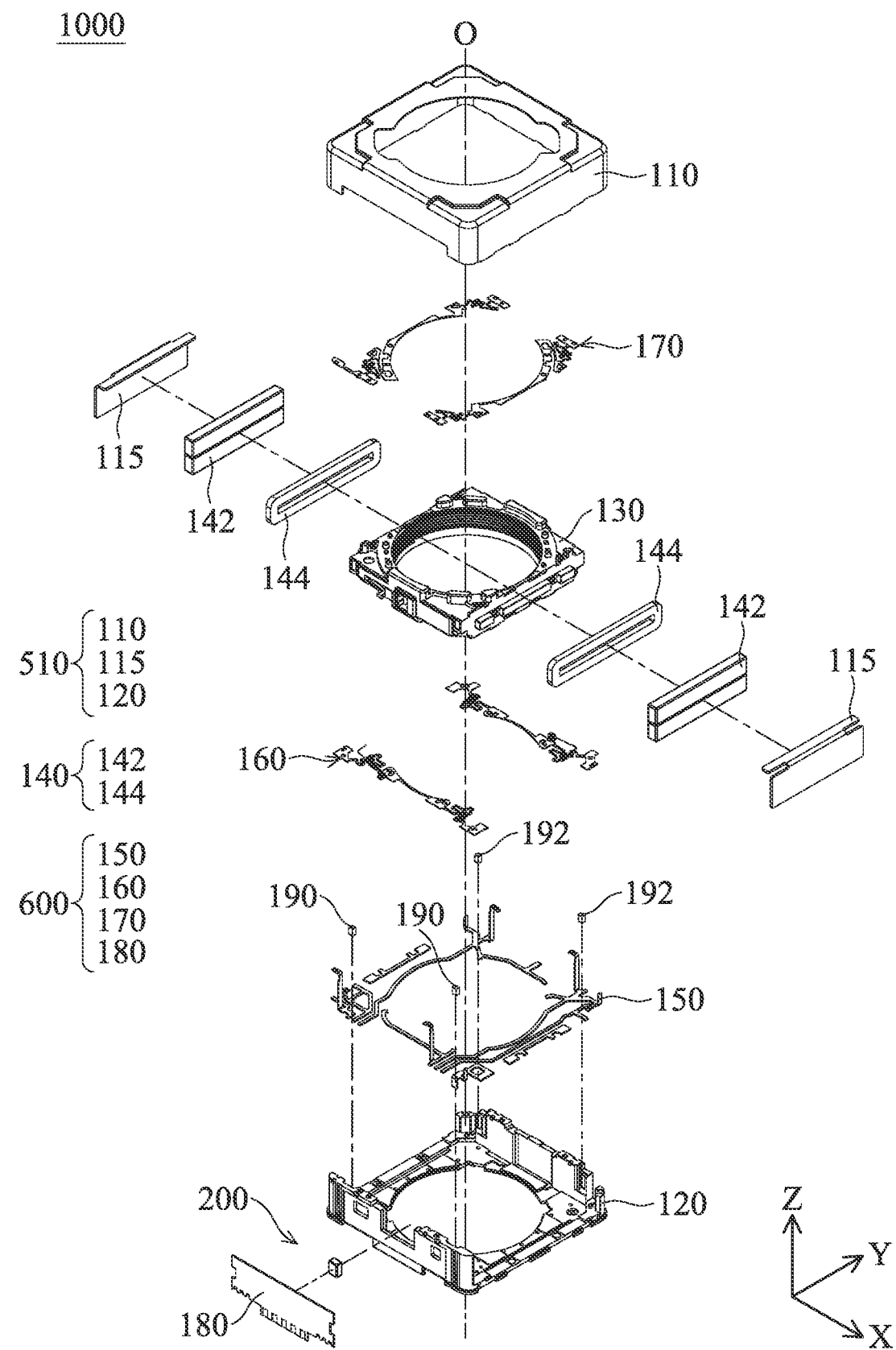
FIG. 1B is an exploded view of the optical element driving mechanism.
Figure 1C:
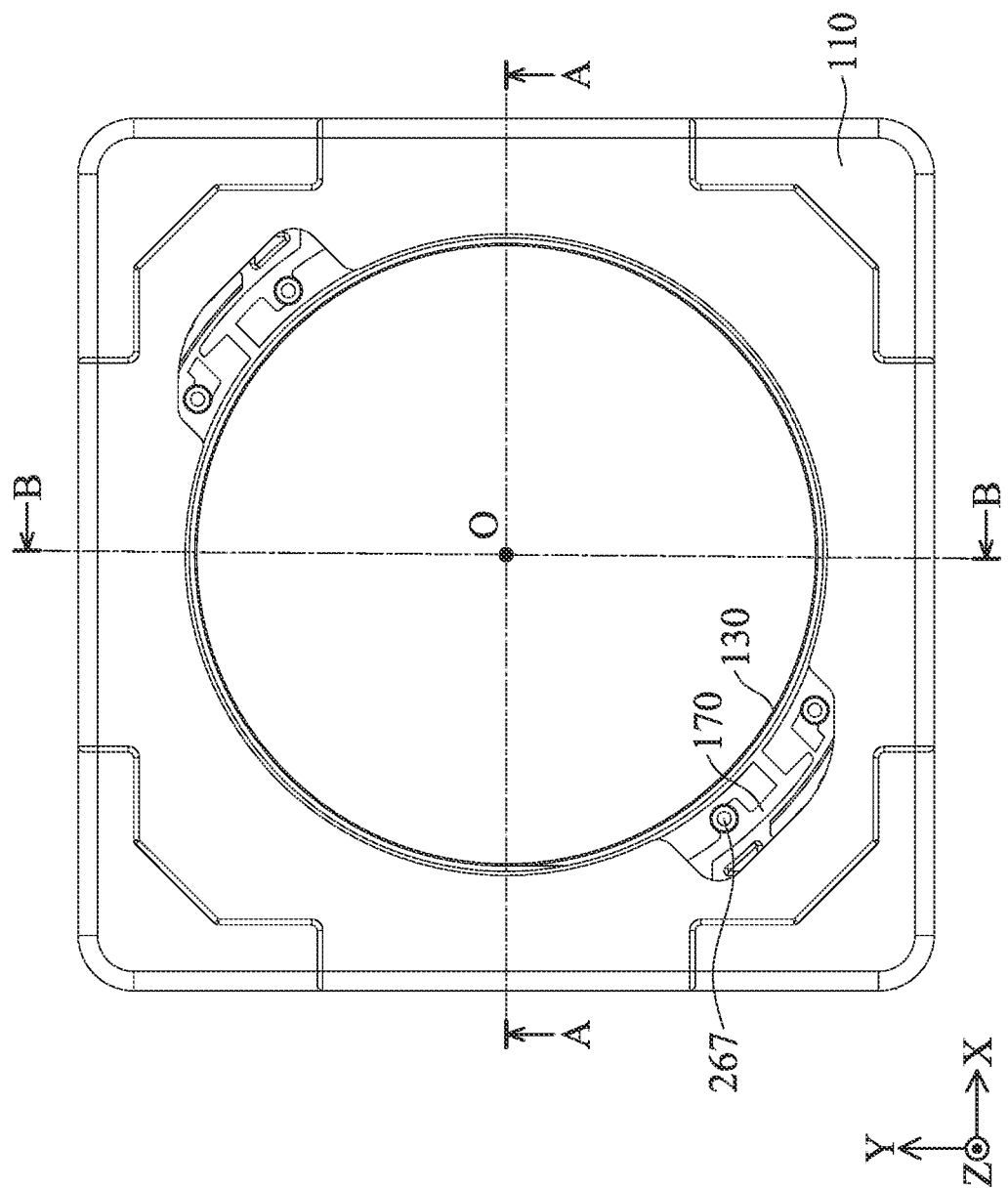
FIG. 1C is a top view of the optical element driving mechanism.
Figure 1D:
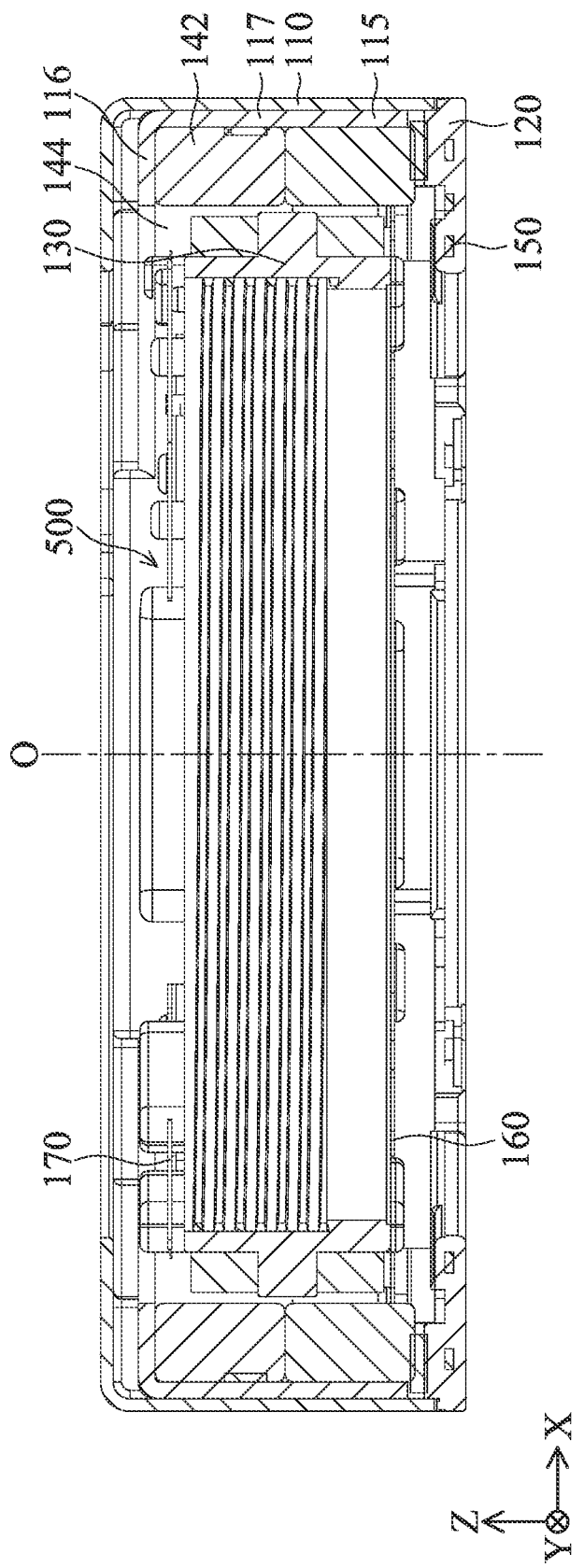
FIG. 1D is a cross-sectional view illustrated along the line A-A in FIG. 1C.
Figure 1E:
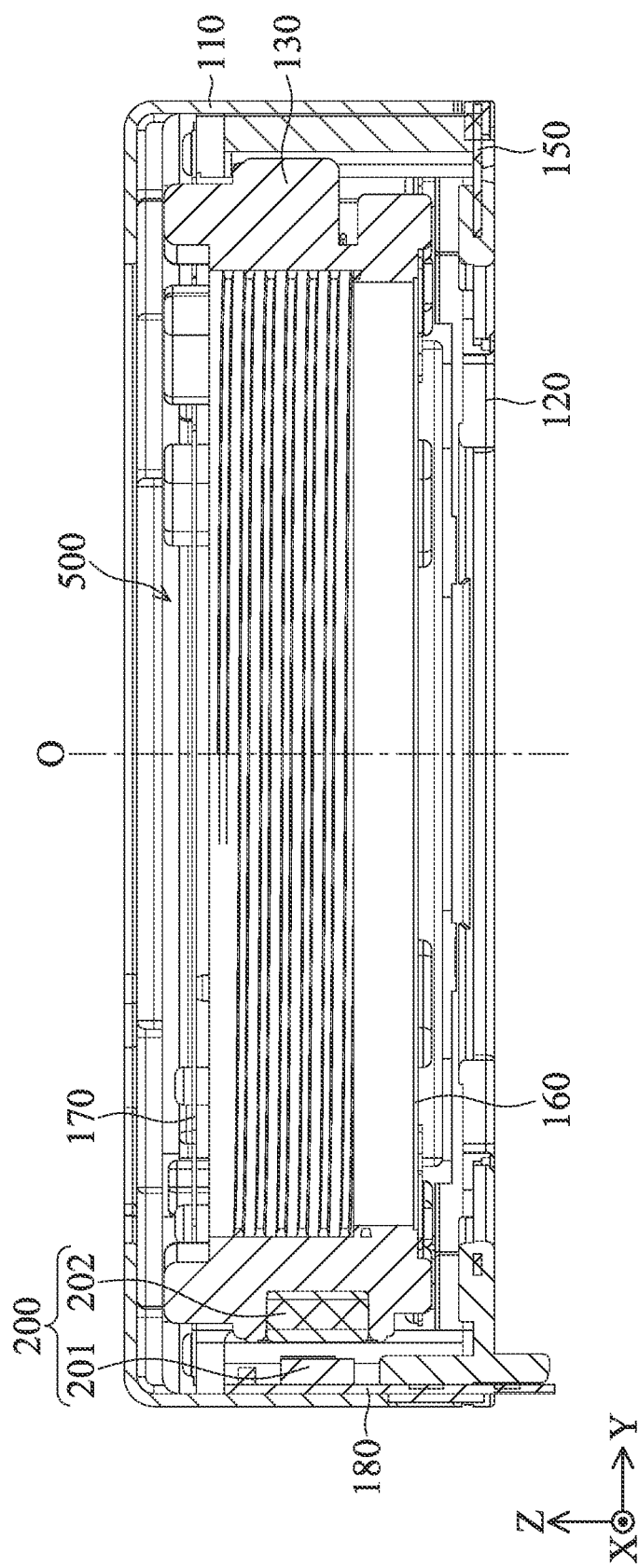
FIG. 1E is a cross-sectional view illustrated along the line B-B in FIG. 1C.

Refer to FIG. 1A to FIG. 1E, wherein FIG. 1A is a schematic view of an optical element driving mechanism 1000 in some embodiments of the present disclosure. FIG. 1B is an exploded view of the optical element driving mechanism 1000. FIG. 1C is a top view of the optical element driving mechanism 1000. FIG. 1D is a cross-sectional view illustrated along the line A-A in FIG. 1C. FIG. 1E is a cross-sectional view illustrated along the line B-B in FIG. 1C.

The optical element driving mechanism 1000 may be used for driving an optical element (e.g. the optical element 400), or may be used for driving different optical elements, such as a lens, a mirror, a prism, a beam splitter, an aperture, a liquid lens, an image sensor, a camera module, or a ranging module. It should be noted that the definition of the optical element is not limited to the element that is related to visible light, and other elements that relate to invisible light (e.g. infrared or ultraviolet) are also included in the present disclosure.

As shown in FIG. 1A to FIG. 1D, in some embodiments, the optical element driving mechanism 1000 mainly includes a case 110, a frame 115, a bottom 120, a movable portion 130, a first magnetic element 142, a first coil 144, a second circuit element 150, a third circuit element 160, a fourth circuit element 170, a first circuit element 180, first damping element 190, second damping element 192, and a position sensing assembly 200 arranged along a main axis O. The optical element driving mechanism 1000 may be used for driving the optical element to move to achieve auto focus (AF) or optical image stabilization (OIS).

The case 110, the frame 115, and the bottom 120 may be called as a fixed portion 510. The movable portion 130 is movably connected to the fixed portion 510. In other words, the movable portion 130 is movable relative to the fixed portion 510. Moreover, the first magnetic element 142 and the first coil 144 may be called as a driving assembly 140 used for driving the movable portion 130 to move relative to the fixed portion 510. The first circuit element 180, the second circuit element 150, the third circuit element 160, and the fourth circuit element 170 may be called as a circuit assembly 600 electrically connected to the driving assembly 140. The driving assembly 140 may connect to an external circuit (e.g. the external circuit 610 shown below) through the circuit assembly 600. In some embodiments, the driving assembly 140 may electrically connect to the second circuit element 150 through the third circuit element 160.

The case 110 and the bottom 120 may be combined to form a shell of the optical element driving mechanism 1000, such as may generate an accommodating space 500. Other elements of the optical element driving mechanism 1000 (e.g. the frame 115 or the movable portion 130) may be disposed in the accommodating space 500. The bottom 120 may be affixed on the case 110. It should be noted that a case opening and a bottom opening may be formed on the case 110 and the bottom 120, respectively. The center of the case opening corresponds to the main axis O, and the bottom opening corresponds to an image sensor (not shown) outside the optical element driving mechanism 1000. Therefore, the optical element in the optical element driving mechanism 1000 may perform focus with the image sensor along the main axis O.

The movable portion 130 has a through hole, the optical element may affixed in the through hole, and the first coil 144 may be disposed on the external surface of the movable portion 130. The first magnetic element 142 may be affixed on the fixed portion 510 (e.g. the bottom 120). It should be noted that the interaction between the first magnetic element 142 and the first coil 144 generates a magnetic force to move the movable portion 130 relative to the fixed portion 510 along the main axis O to achieve fast focus.

In this embodiment, the movable portion 130 and the optical element disposed therein are movably disposed in the accommodating space 500. More specifically, the movable portion 130 may be connected to and suspended in the fixed portion 510 by the third circuit element 160 and the fourth circuit element 170 made of a metal material. When current is applied to the first coil 144, the first coil 144 can act with the magnetic field of the first magnetic element 142 to generate an electromagnetic force to move the movable portion 130 and the optical element along the main axis O relative to the fixed portion 510 to achieve auto focusing.

In some embodiments, the second circuit element 150 may be provided in the bottom 120 and electrically connects to electronic elements disposed inside or outside the optical element driving mechanism 1000 for achieve auto focus or optical image stabilization. The second circuit element 150 may transfer electrical signal to the driving coil 640 through the third circuit element 160 to the first coil 144 to control the movement of the movable portion 130 in X, Y, or Z directions. The second circuit element 150 may be assembled with the third circuit element 160 by soldering or laser welding to allow the first coil 144 connecting to external circuits (e.g. the external circuit 610 shown below). Moreover, the second circuit element 150 may be electrically connected to the fourth circuit element 170, so the second circuit element 150 may be connected to other optical unit (e.g. the optical unit 300) through the fourth circuit element 170, which will be described later.

Furthermore, in some embodiments, a plurality of additional driving coils (not shown) may be embedded in the bottom 120 to interact with the first magnetic element 142 for moving the movable portion 130. Driving forces having different directions may be generated when the first coil 144 and the additional driving coil in the bottom 120 interacting with the first magnetic element 142 to perform auto focus or optical image stabilization.

Figure 2A:
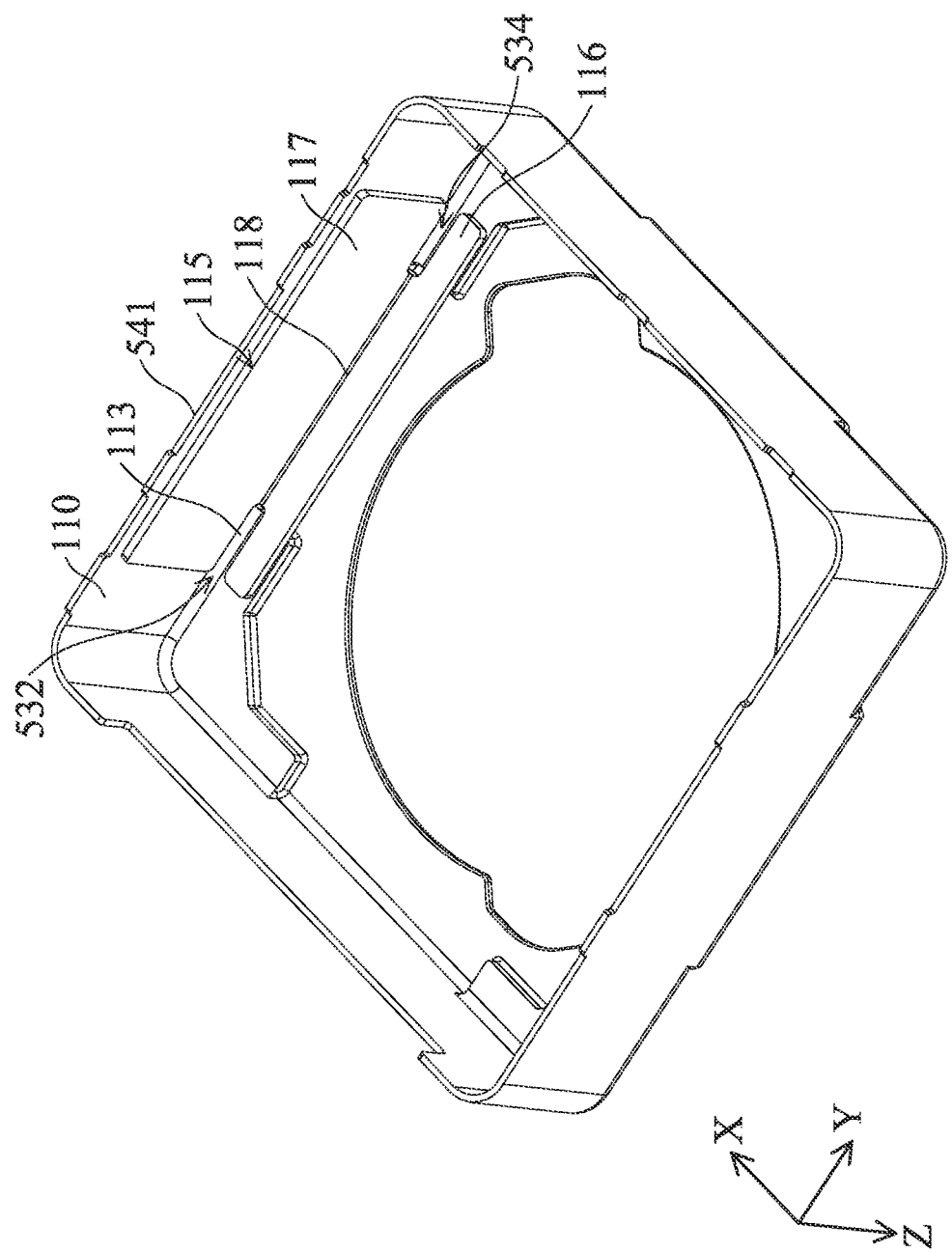
FIG. 2A to FIG. 2C are schematic views of the case and the frame viewed in different directions.
Figure 2B:
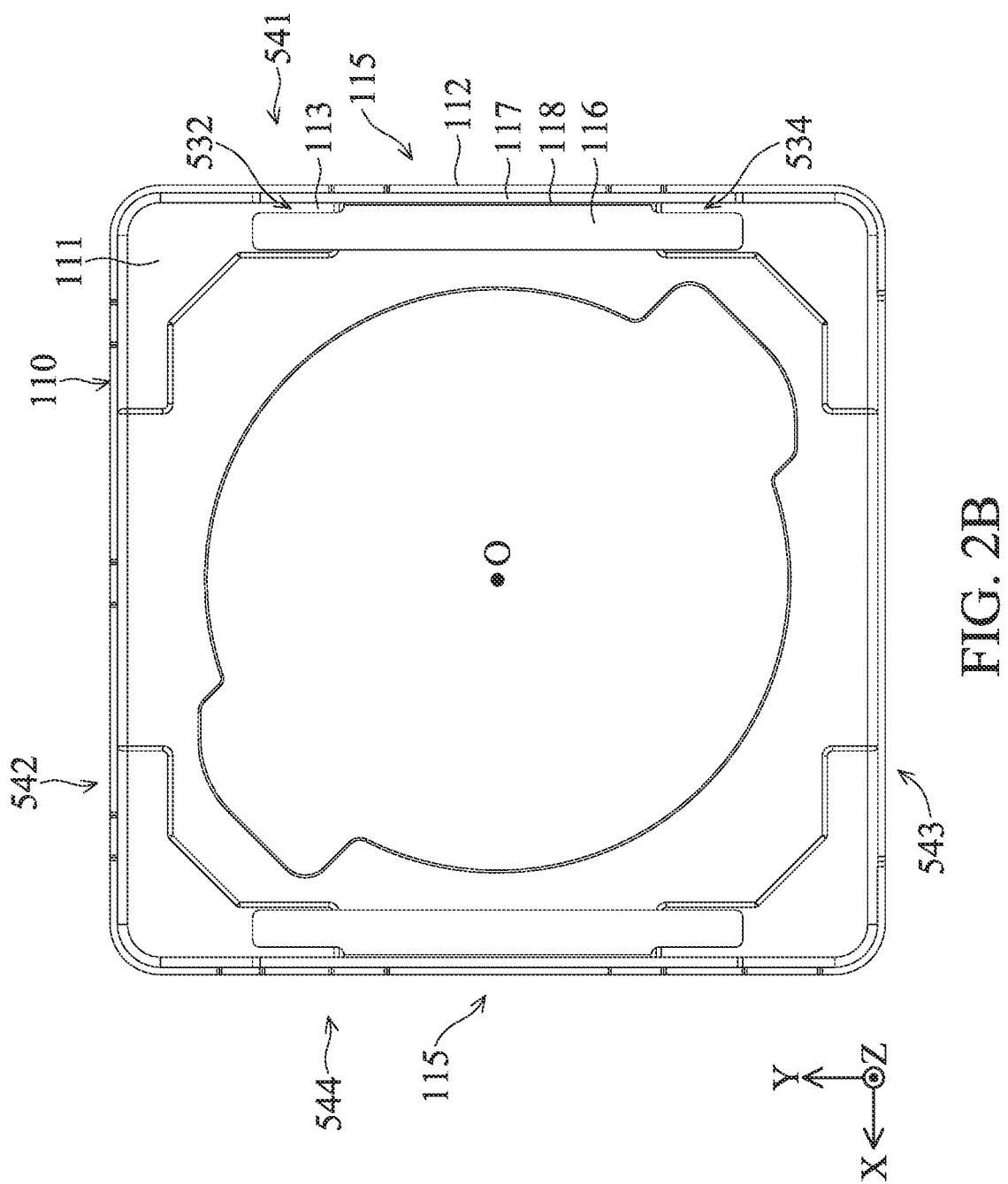
Figure 2C:
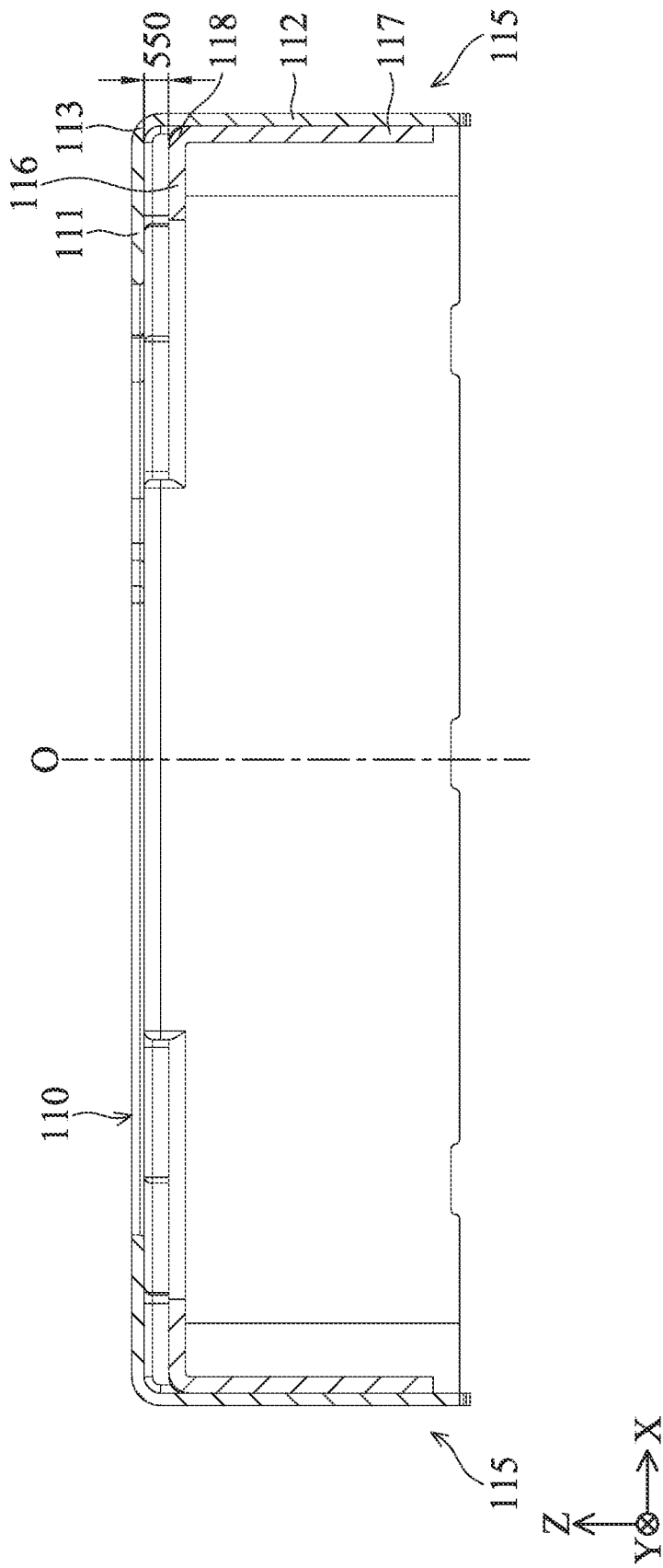

FIG. 2A to FIG. 2C are schematic views of the case 110 and the frame 115 viewed in different directions. In some embodiments, the material of the case 110 and the frame 115 may include metal, and the materials of the case 110 and the frame 115 may be different. For example, the magnetic conductivity of the frame 115 may be higher than that of the case 110 to perform magnetic conduction.

As shown in FIG. 2A to FIG. 2C, the case 110 includes a first top wall 111 and a first side wall 112, the first top wall 111 is perpendicular to the main axis O, and the first top wall 111 connects to the first side wall 112 through a first bending portion 113. The frame 115 includes a second top wall 116 and a second side wall 117, the first top wall 111 and the second top wall 116 may be parallel, the first side wall 112 and the second side wall 117 may be parallel, and the second top wall 116 connects to the second side wall 117 through a second bending portion 118.

It should be noted that as shown in FIG. 2A to FIG. 2B, a first opening 532 and a second opening 534 are formed between the second top wall 116 and the second side wall 117. The second bending portion 118 is between the first opening 532 and the second opening 534. When viewed along the main axis O, the first bending portion 113 at least partially overlaps the first opening 532 and the second opening 534. In other words, the first bending portion 113 may expose from the first opening 532 and the second opening 534.

When viewed along the main axis O, the first side wall 112, the second top wall 116, and the second side wall 117 are at a first side 541 of the case 110 that is polygonal. Moreover, a distance 550 greater than zero is between the first top wall 111 and the second top wall 116, and another distance less than the distance 550 may between the first side wall 112 and the second side wall 117, or the first side wall 112 may in direct contact with the second side wall 117. In other words, the shortest distance between the first top wall 111 and the second top wall 116 may be greater than the shortest distance between the first side wall 112 and the second side wall 117.

Figure 3A:
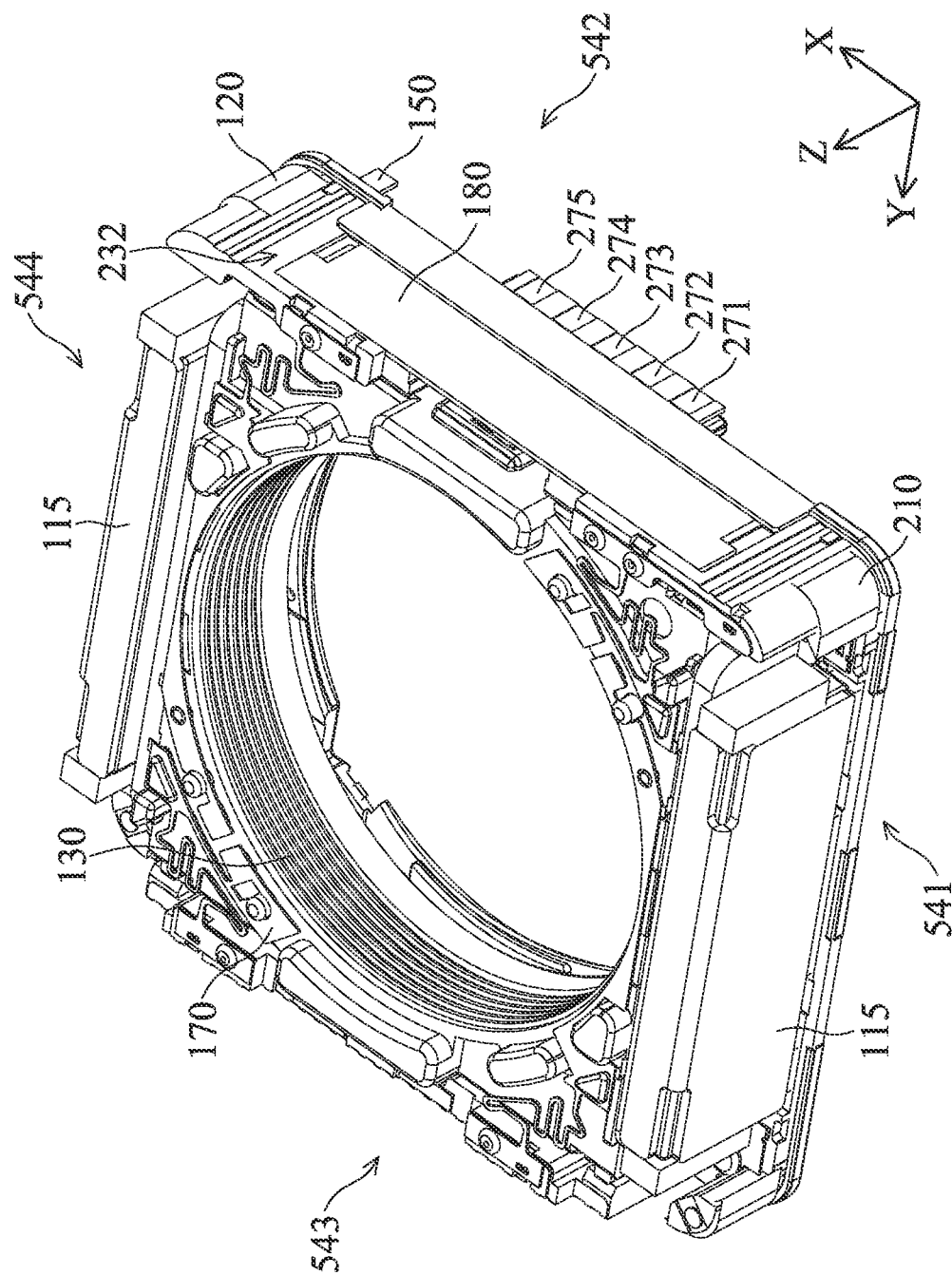
FIG. 3A to FIG. 3C are schematic views of the optical element driving mechanism.
Figure 3B:
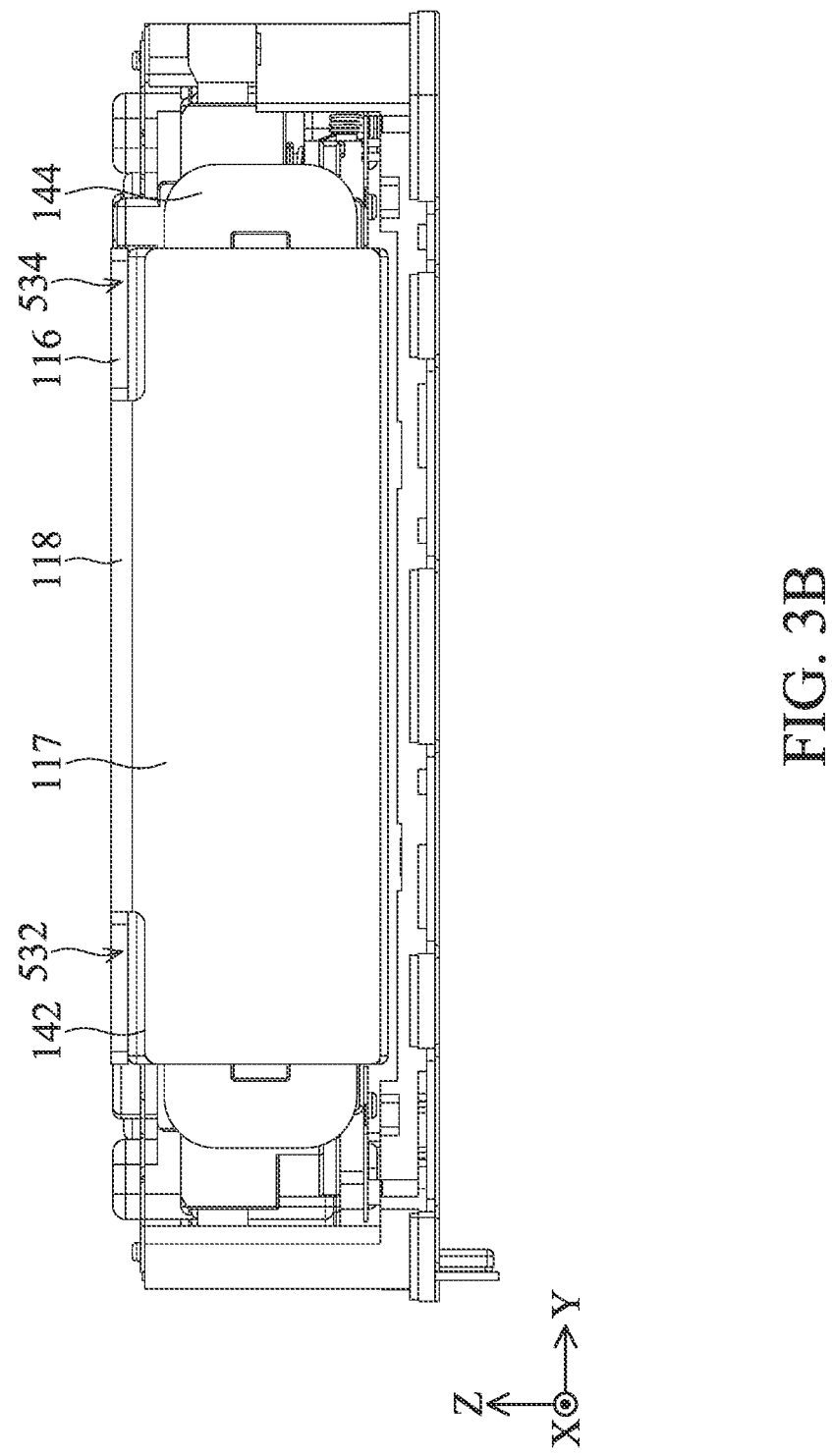
Figure 3C:
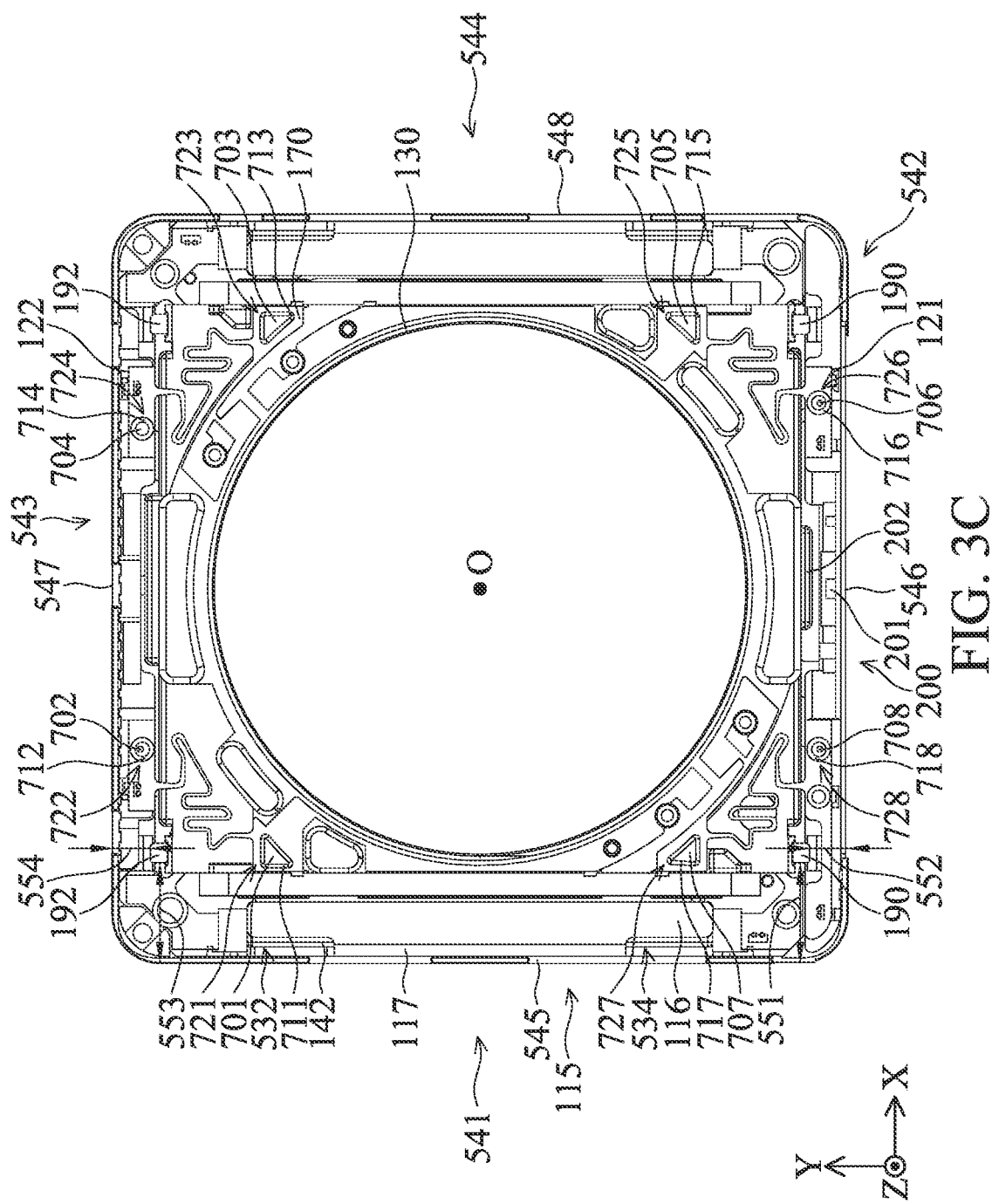

FIG. 3A to FIG. 3C are schematic views of the optical element driving mechanism 1000, wherein the case 110 is omitted to show the internal structures. As shown in FIG. 3C, the optical element driving mechanism 1000 may include a first side 541, a second side 542, a third side 543, and a fourth side 544. The second side 542 and the third side 543 are adjacent to the first side 541 and the fourth side 544. The first side 541 and the fourth side 544 may extend in a direction perpendicular to the extend direction of the second side 542 or the third side 543. The 12 may include a first edge 545, a second edge 546, a third edge 547, and a fourth edge 548 which are position at the first side 541, the second side 542, the third side 543, and the fourth side 544, respectively.

In some embodiments, when viewed along the main axis O, the first magnetic element 142 are at the first side 541 and the fourth side 544. Moreover, as shown in FIG. 1D, the first magnetic element 142 may be affixed on the frame 115, such as affixed on the second side wall 117. Furthermore, as shown in FIG. 3B and FIG. 3C, the first magnetic element 142 may expose from the first opening 532 and the second opening 534. In other words, the first magnetic element 142 may protrude from the second side wall 117.

In some embodiments, the first damping element 190 and the second damping element 192 may be disposed between the movable portion 130 and the fixed portion 510 (e.g. the bottom 120) to absorb the abnormal vibration of the movable portion 130 relative to the fixed portion 510 to prevent the vibration affecting the quality of the image. For example, the first damping element 190 and the second damping element 192 may in direct contact with the bottom 120 and the movable portion 130. In some embodiments, the first damping element 190 and the second damping element 192 may include materials that are not metal, such as resin, plastic, rubber, or silicone, but it is not limited thereto.

As shown in FIG. 3C, a shortest distance 551 is between the first damping element 190 and the first edge 545, a shortest distance 552 is between the first damping element 190 and the second edge 546, and the shortest distance 551 and the shortest distance 552 are different. For example, the shortest distance 551 may be greater than the shortest distance 552. Moreover, a shortest distance 553 is between the second damping element 192 and the first edge 545, a shortest distance 554 is between the second damping element 192 and the third edge 547, and the shortest distance 553 and the shortest distance 554 are different. For example, the shortest distance 5535 may be greater than the shortest distance 554. Therefore, vibration in specific directions may be absorbed to further stabilize the optical element driving mechanism 1000.

In some embodiments, the first circuit element 180 and the position sensing assembly 200 may be disposed on the second side 542. For example, the position sensing assembly 200 may be disposed on the center of the second side 542. The position sensing assembly 200 may include a sensing element 201 and a sensing magnetic element 202 disposed on the fixed portion 510 and the movable portion 130, respectively. The sensing element 201 may be used for detect the variation of magnetic field, such as may include a Hall sensor, a magnetoresistance effect sensor (MR sensor), a giant magnetoresistance effect sensor (GMR sensor), a tunneling magnetoresistance effect sensor (TMR sensor), or a fluxgate sensor. The sensing magnetic element 202 may be a magnet to provide magnetic field. When the movable portion 130 moves relative to the fixed portion 510, the magnetic field generated by the sensing magnetic element 202 and detected by the sensing element 201 will change, so the movement of the movable portion 130 relative to the fixed portion 510 may be determined by the magnetic field variation. Moreover, the sensing element 201 may be electrically connected to the first circuit element 180.

Figure 4A:
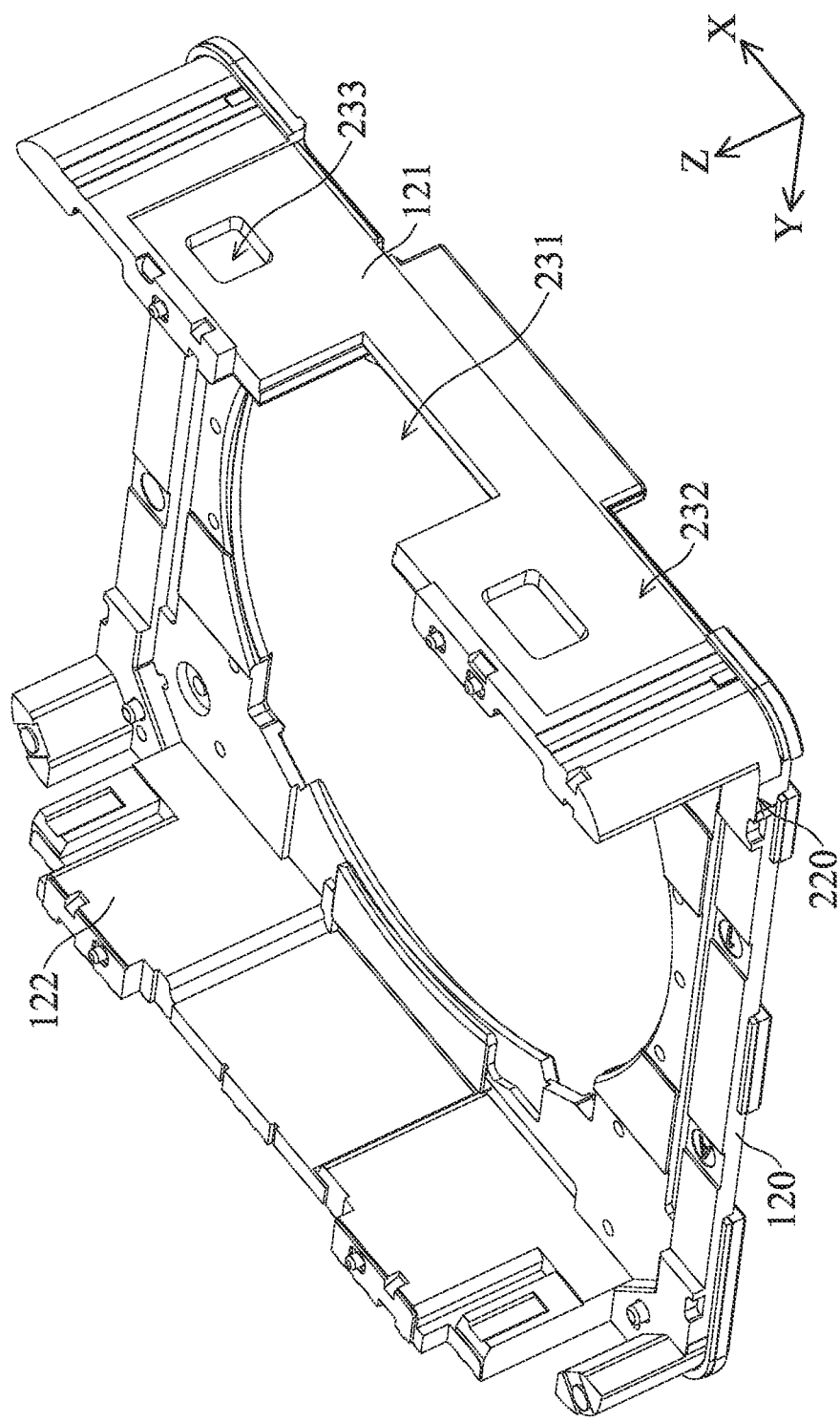
FIG. 4A and FIG. 4B are schematic views of some elements of the optical element driving mechanism viewed in different directions.
Figure 4B:
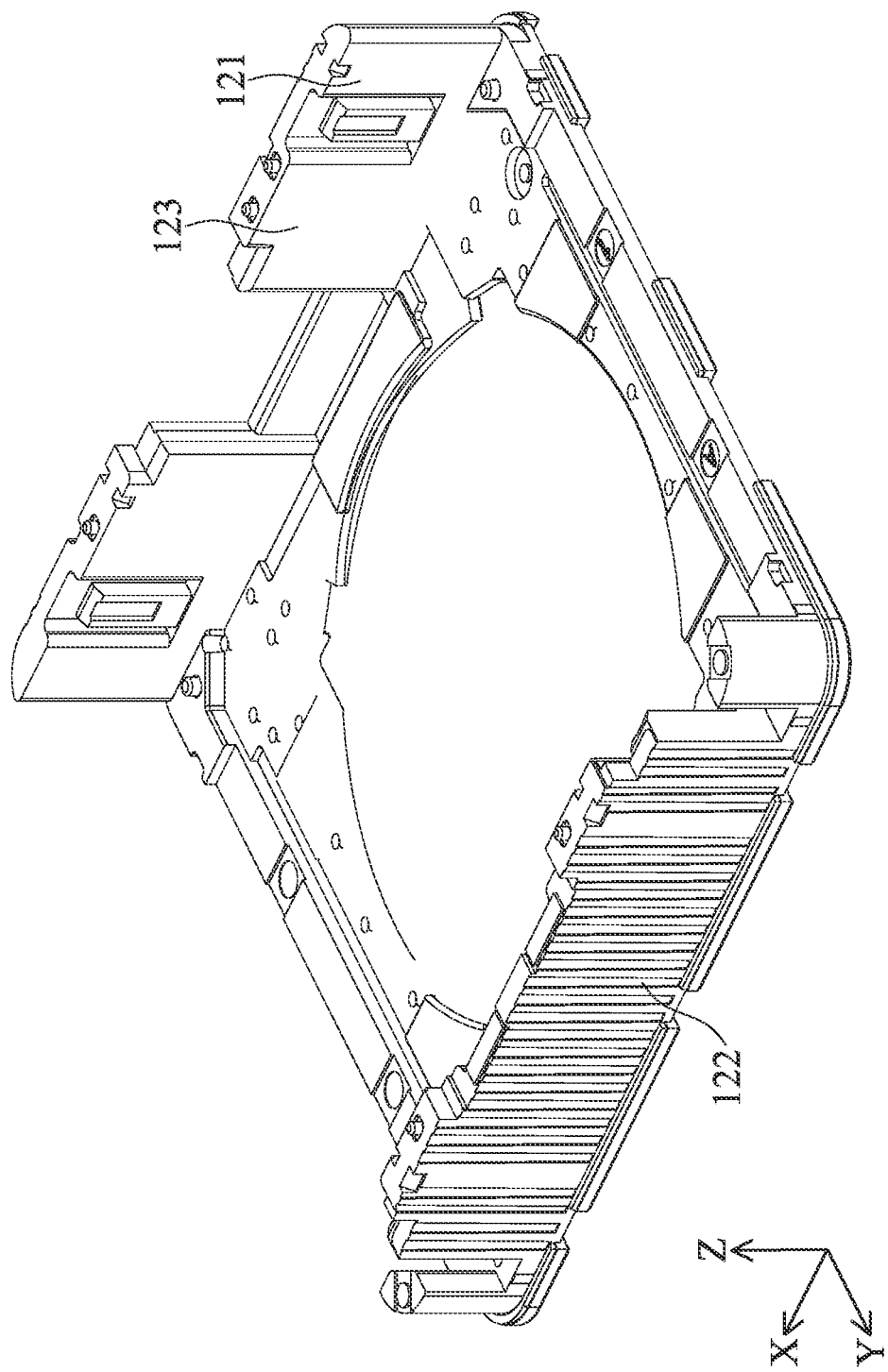
Figure 5:
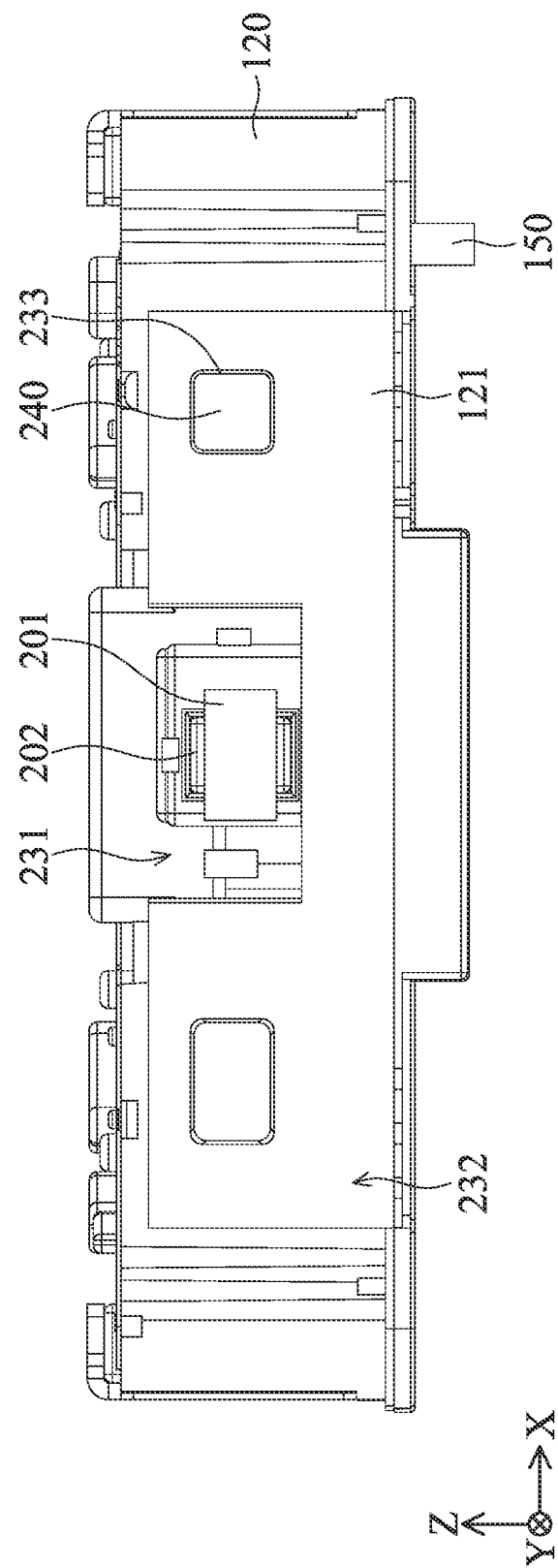
FIG. 5 is a schematic view of some elements of the optical element driving mechanism.

FIG. 4A and FIG. 4B are schematic views of some elements of the optical element driving mechanism 1000 viewed in different directions. FIG. 5 is a schematic view of some elements of the optical element driving mechanism 1000, wherein the elements at the side of the first blocking wall 121 are shown, and some elements are omitted, such as the first circuit element 180. As shown in FIG. 4A, FIG. 4B, and FIG. 5, the optical element driving mechanism 1000 may further include a first blocking wall 121 and a second blocking wall 122 disposed on opposite sides of the bottom 120 and extending along the main axis O. The first blocking wall 121 and the second blocking wall 122 may formed as one piece with the bottom 120. The first blocking wall 121 may include a first stopping surface 123 facing the movable portion 130 to limit the movement of the movable portion 130 relative to the fixed portion 510. Furthermore, as shown in FIG. 3C, the first blocking wall 121 is at the second side 542, and the second blocking wall 122 is at the third side 543. The first damping element 190 may at the first blocking wall 121, and the second damping element 192 may at the second blocking wall 122. In some embodiments, the first circuit element 180 may be affixed on the first blocking wall 121, such as may be disposed at a side opposite from the first stopping surface 123.

Furthermore, a first adhesive element 210 may be disposed between the case 110 and the bottom 120, such as may be disposed on a first connect reinforcement structure 220 at the corner of the bottom 120. The first connect reinforcement structure 220 may position at the first blocking wall 121, and may have a recessed structure. The first connect reinforcement structure 220 may be used for increasing the contact area between the first adhesive element 210 and the first blocking wall 121 to increase the adherence of the first adhesive element 210.

In some embodiments, the first blocking wall 121 may include a first recess 231, a second recess 232, and a third recess 233. It should be noted that the first recess 231 and the third recess 233 may position in the second recess 232. The first recess 231 may be used for accommodating the position sensing assembly 200, the second recess 232 may be used for accommodating the first circuit element 180, and the third recess 233 may be used for accommodating a second adhesive element 240. In some embodiments, the first circuit element 180 may be affixed on the first blocking wall 121 by the second adhesive element 240. In some embodiments, the depth of the first recess 231 may be deeper than the depth of the third recess 233. For example, the first recess 231 may penetrate the first blocking wall 121, and the third recess 233 does not penetrate the first blocking wall 121.

Figure 6A:
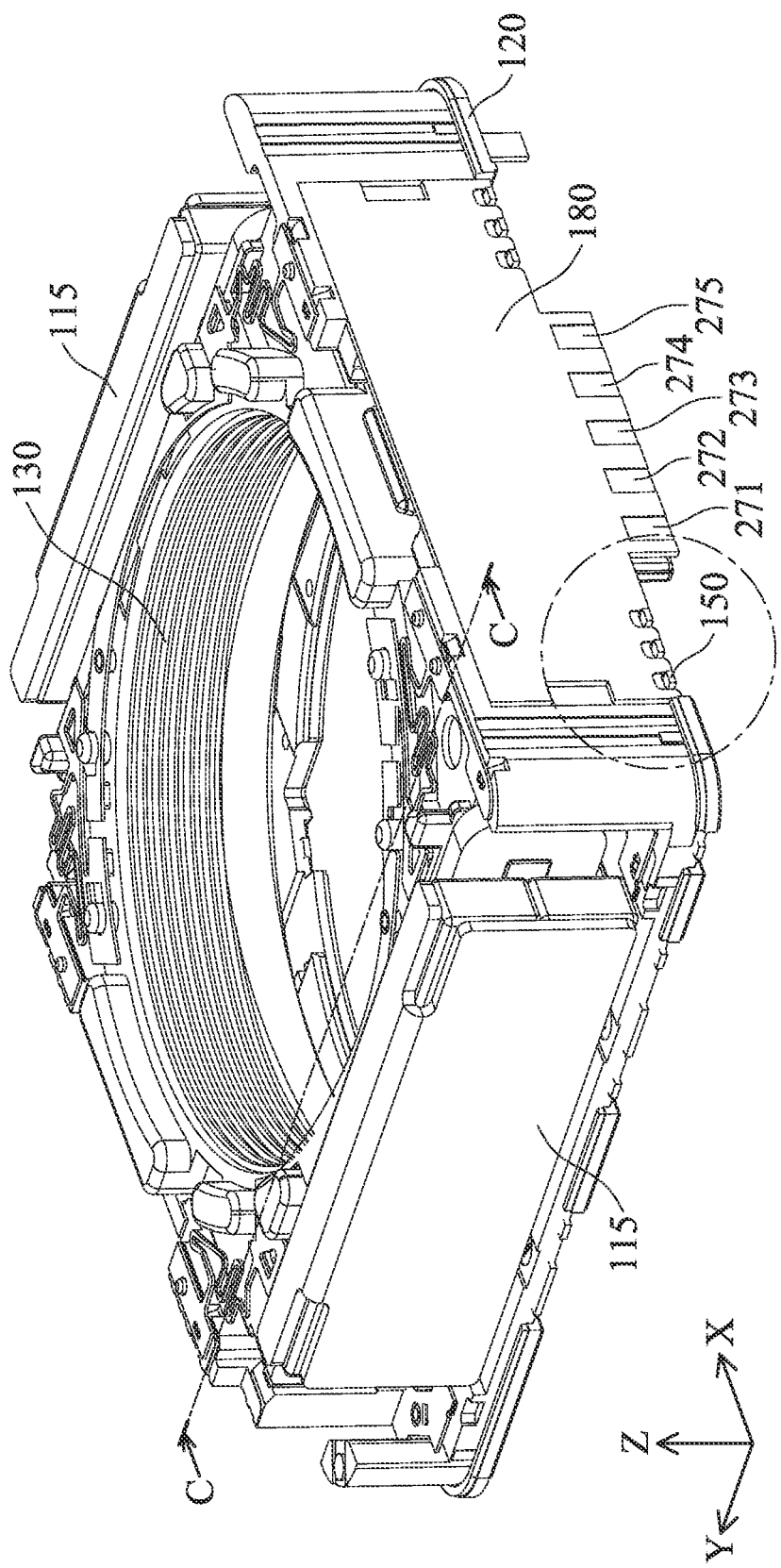
FIG. 6A is a schematic view of some elements of the optical element driving mechanism.
Figure 6B:
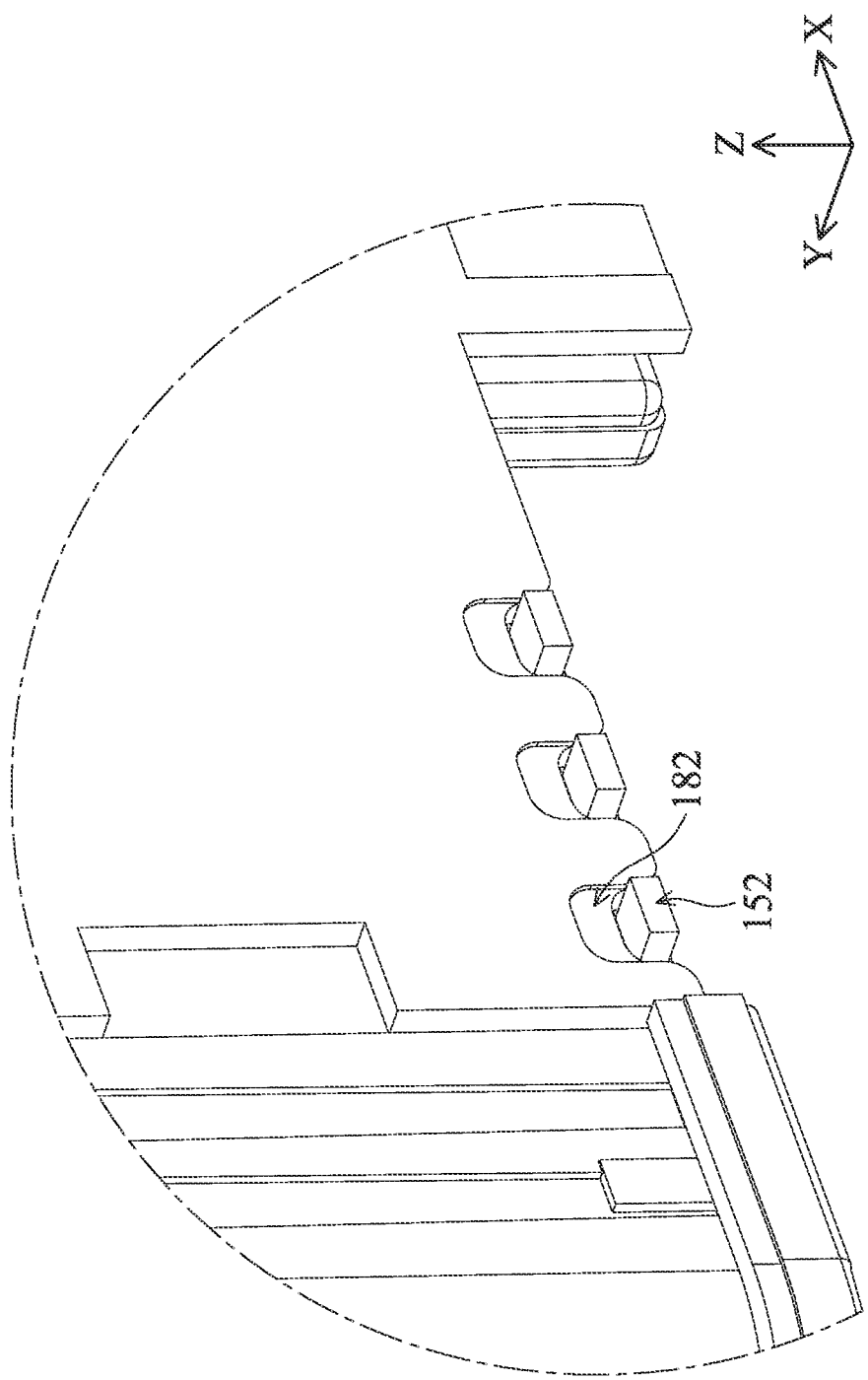
FIG. 6B is an enlarged view of FIG. 6A.
Figure 6C:
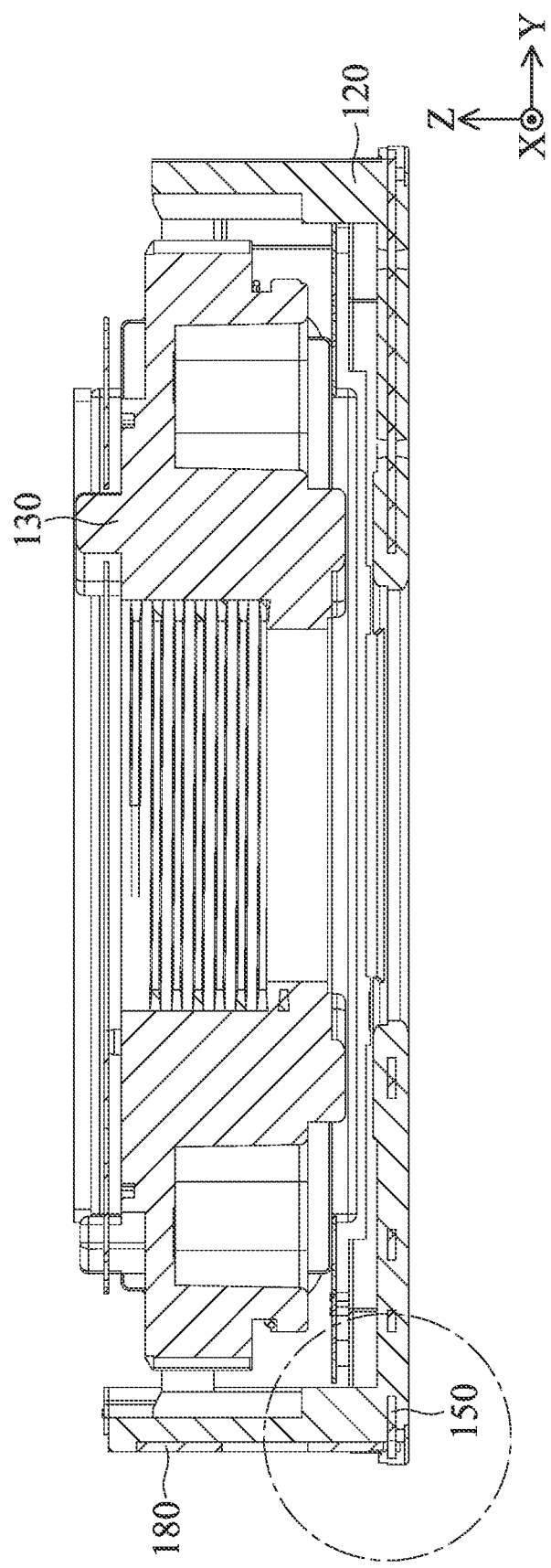
FIG. 6C is a cross-sectional view illustrated along the line C-C in FIG. 6A.
Figure 6D:
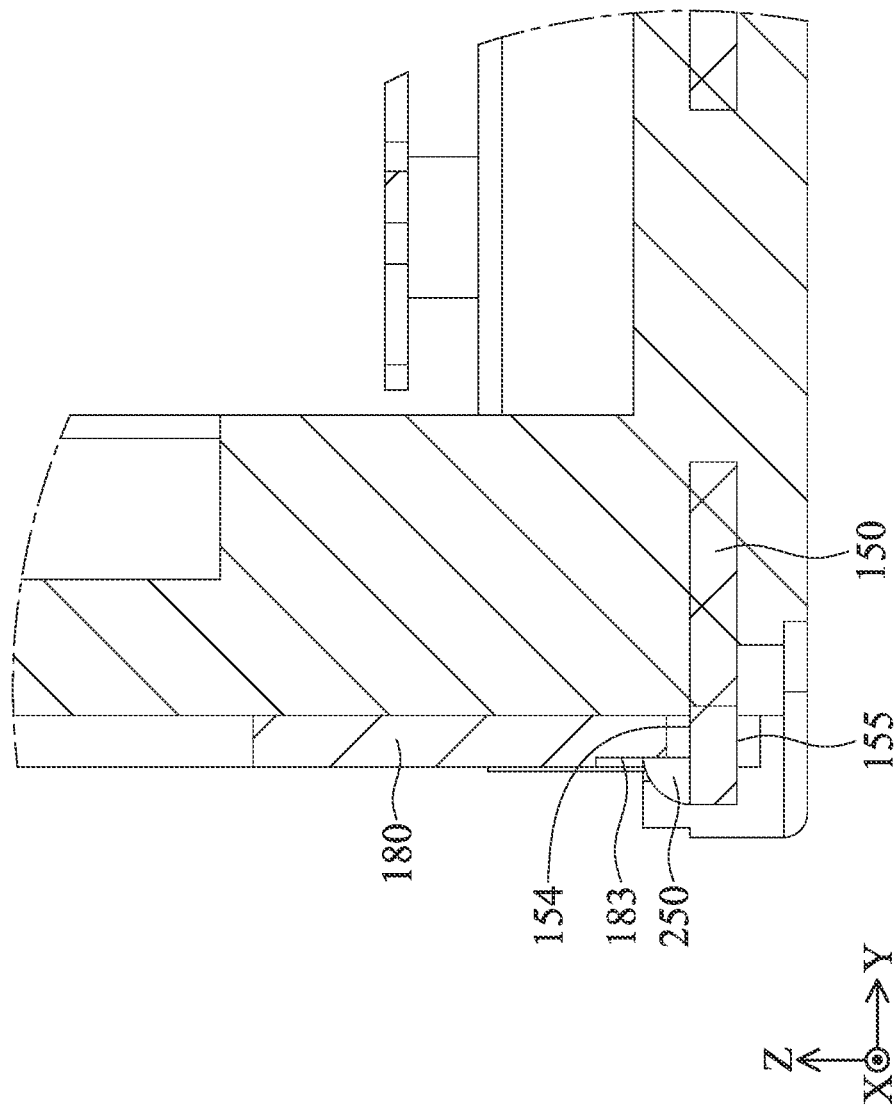
FIG. 6D is an enlarged view of FIG. 6C.
Figure 6E:
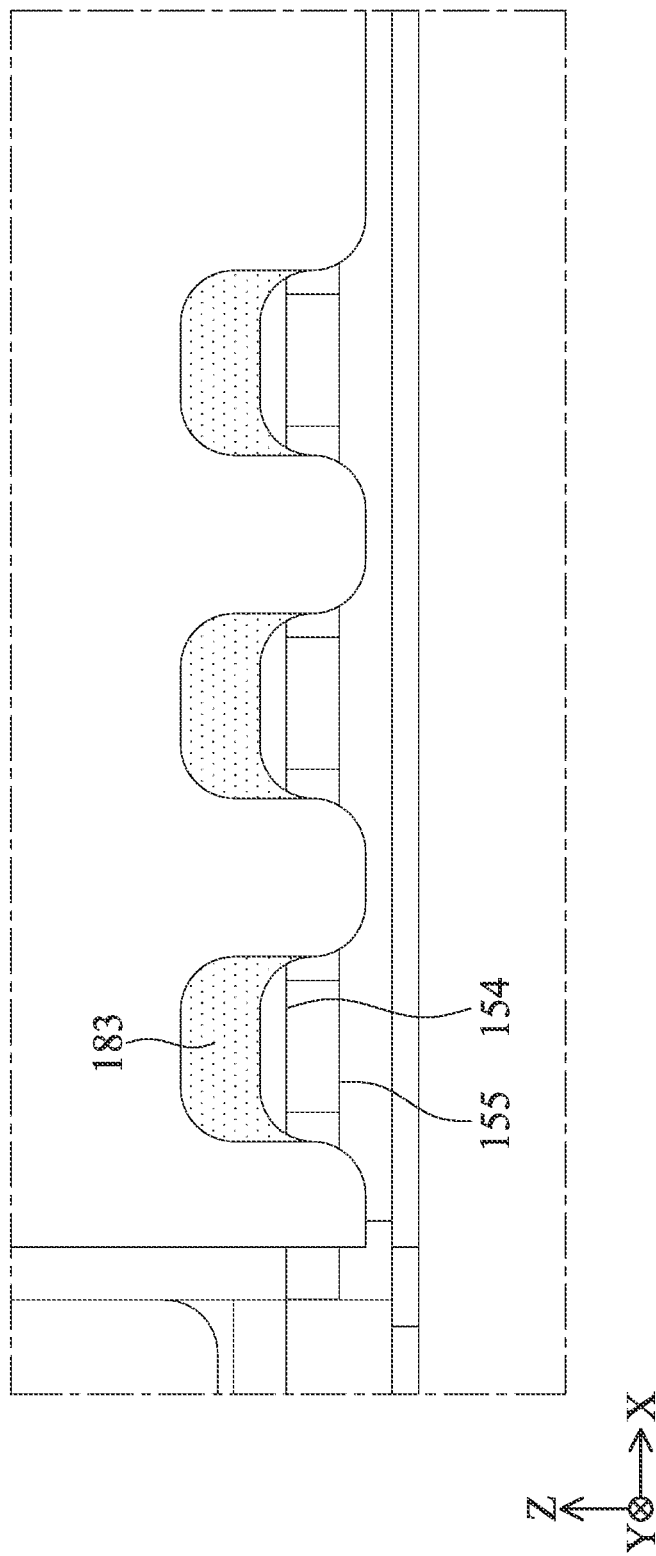
FIG. 6E is an enlarged view showing the second circuit element and the first circuit element.

FIG. 6A is a schematic view of some elements of the optical element driving mechanism 1000. FIG. 6B is an enlarged view of FIG. 6A. FIG. 6C is a cross-sectional view illustrated along the line C-C in FIG. 6A. FIG. 6D is an enlarged view of FIG. 6C. FIG. 6E is an enlarged view showing the second circuit element 150 and the first circuit element 180. As shown in FIG. 6A to FIG. 6E, the second circuit element 150 may be disposed on the bottom 120, such as may have an embedded portion embedded in the bottom 120 and does not expose from the bottom 120, and another exposed portion exposed from the bottom 120. The first circuit element 180 may include a first contact 182, the second circuit element 150 may include a second contact 152, and the second contact 152 and the first contact 182 are electrically connected to each other through a first electrical connecting element 250 (FIG. 6D).

In some embodiments, the first electrical connecting element 250 is in direct contact with a first surface 183 of the first circuit element 180 and a second surface 154 of the second circuit element 150. The first electrical connecting element 250 may include conductive gel, solder, or welding components which may be used for electrical connection. The first surface 183 and the second surface 154 may be not parallel, such as may be perpendicular. As shown in FIG. 6E, in the X direction, the first surface 183 and the second surface 154 are at least partially overlap each other. For example, at least a portion of the first surface 183 and the second surface 154 have identical Z coordinate. Moreover, the second contact 152 may further include a third surface 155, and at least a portion of the second surface 154 and the third surface 155 overlap each other in the direction of the main axis O extends. As shown in FIG. 6E, the first surface 183 and the third surface 155 do not overlap each other in the X direction. In other words, in the Z direction, the lowest point of the first surface 183 may between two planes defined by the second surface 154 and the third surface 155.

Figure 7A:
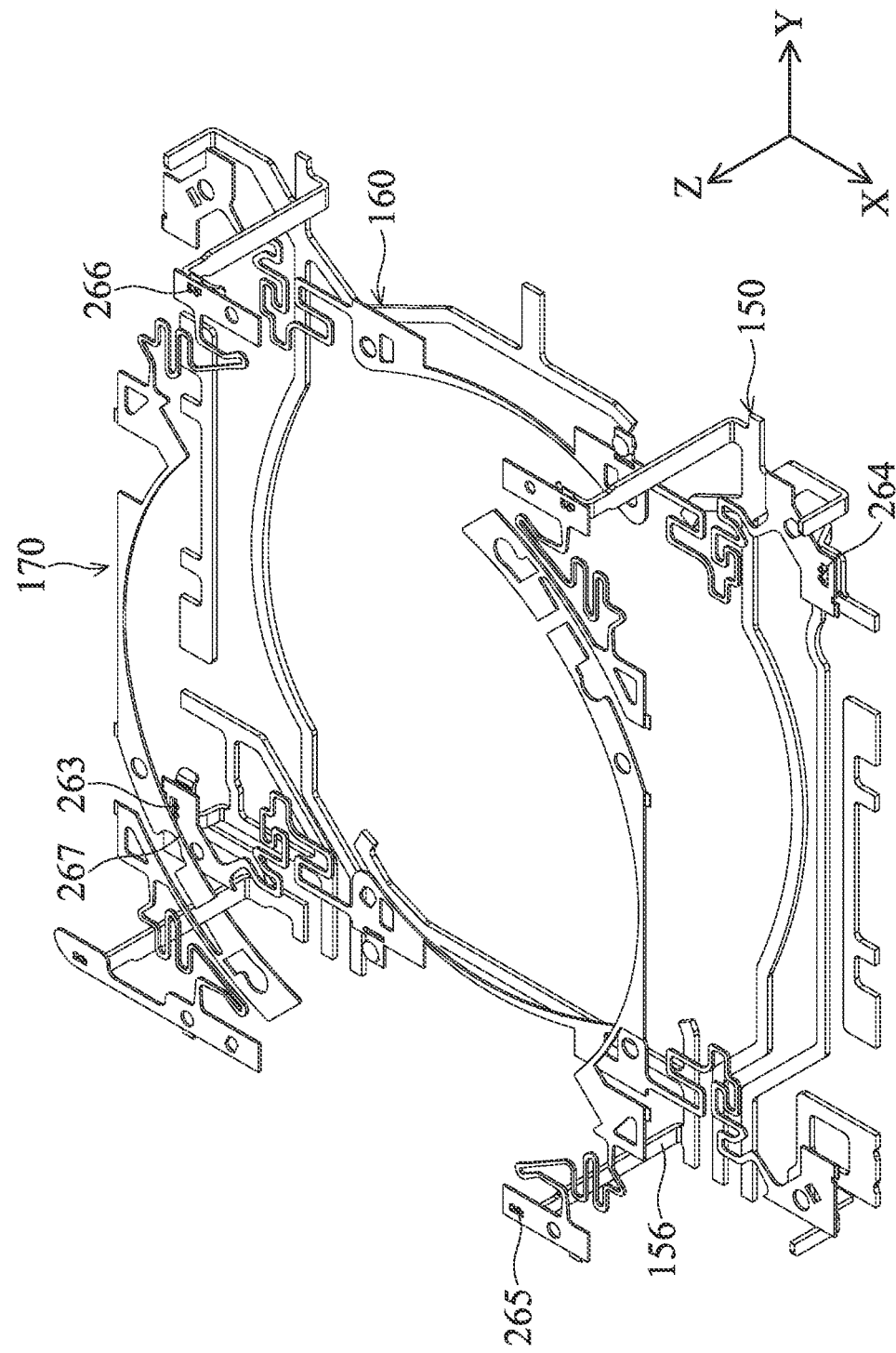
FIG. 7A and FIG. 7B are schematic views of the second circuit element, the third circuit element, and the fourth circuit element viewed in different directions.
Figure 7B:
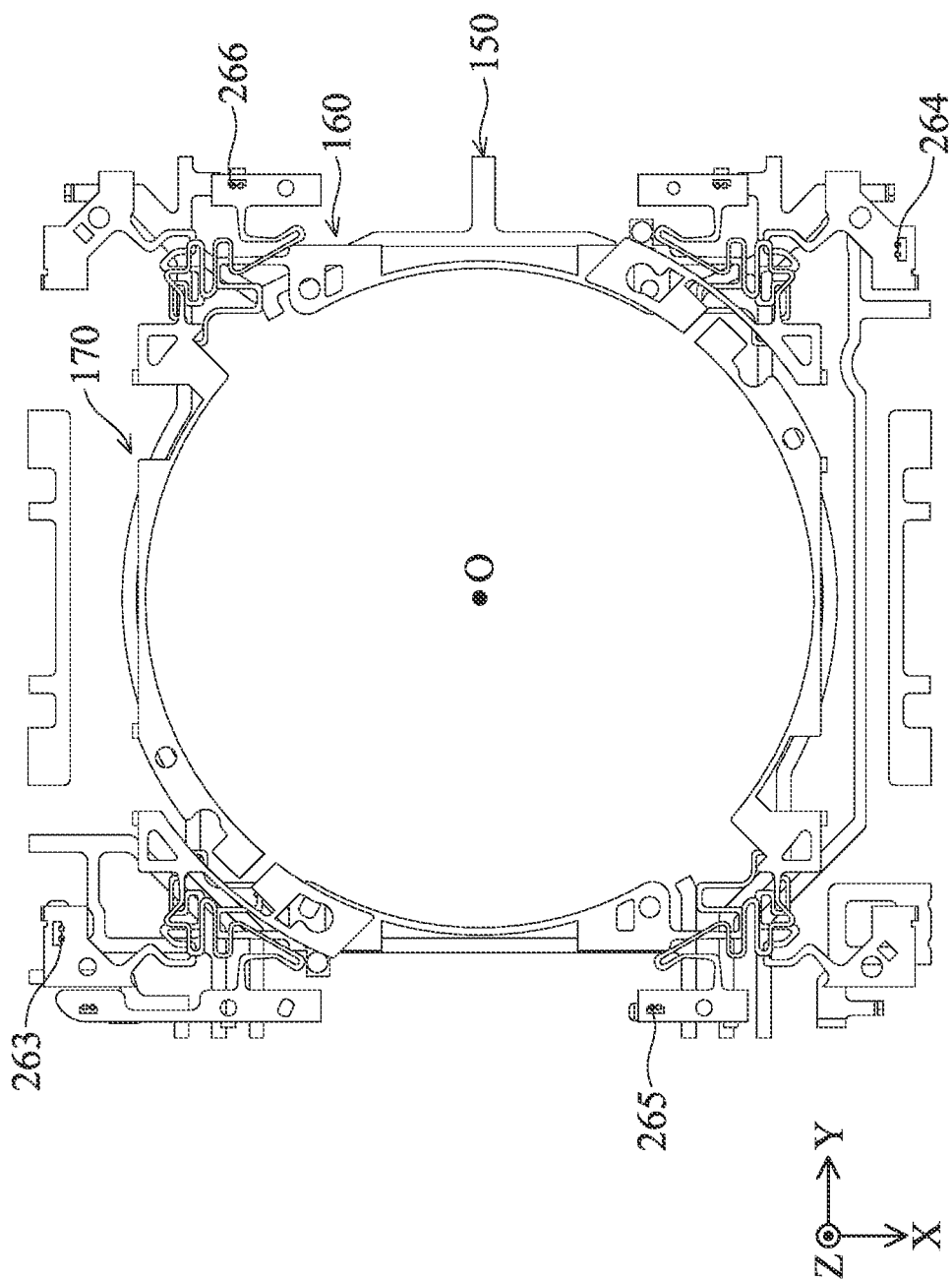

FIG. 7A and FIG. 7B are schematic views of the second circuit element 150, the third circuit element 160, and the fourth circuit element 170 viewed in different directions. The third circuit element 160 and the fourth circuit element 170 may be plate-shaped. The second circuit element 150 may be electrically connected to the third circuit element 160 and the fourth circuit element 170. For example, the third circuit element 160 may include a third contact 263 and the fourth contact 264, and the fourth circuit element 170 may include a fifth contact 265 and a sixth contact 266. The third circuit element 160 may be electrically connected to the second circuit element 150 by the third contact 263 and the fourth contact 264, and the fourth circuit element 170 may be electrically connected to the second circuit element 150 by the fifth contact 265 and the sixth contact 266. As shown in FIG. 7B, when viewed along the direction that the main axis O extends, the third contact 263 and the fourth contact 264 are at the diagonal of the optical element driving mechanism 1000, and the fifth contact 265 and the sixth contact 266 are at the diagonal of the optical element driving mechanism 1000. It should be noted that the fifth contact 265 may position at the first blocking wall 121, which means the second circuit element 150 may at least partially embedded in and does not expose from the first blocking wall 121 to protect the second circuit element 150.

Figure 8:
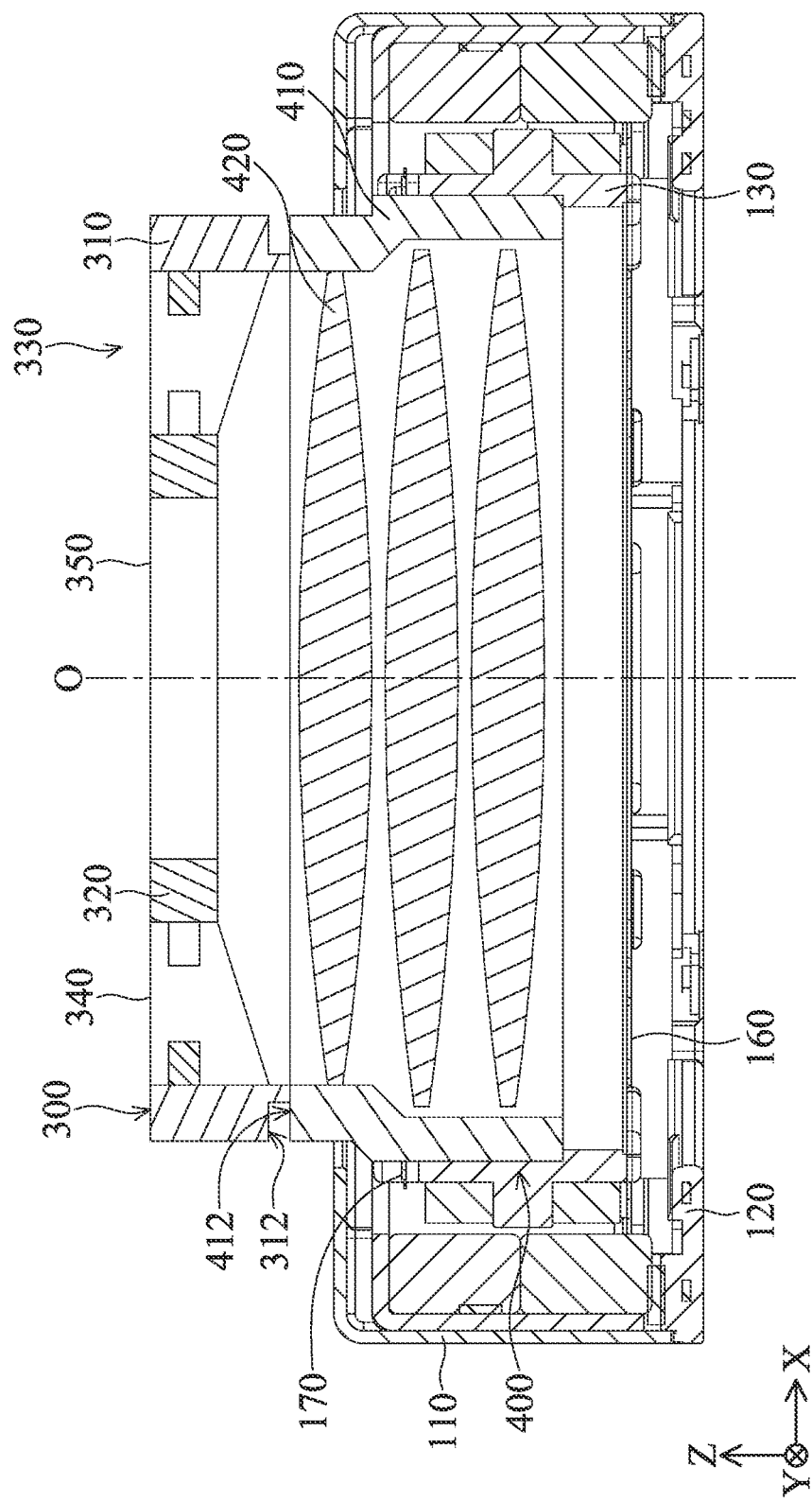
FIG. 8 is a schematic view of the optical element driving mechanism illustrated according to some embodiments.

FIG. 8 is a schematic view of the optical element driving mechanism 1000 illustrated according to some embodiments. In some embodiments, the optical element driving mechanism 1000 may further include an optical unit 300 disposed on the optical element 400. The optical element 400 may be disposed in the movable portion 130, such as affixed in the through hole of the movable portion 130, and may move with the movable portion 130.

In some embodiments, the optical unit 300 may mainly include a base 310, a movable element 320, a driving element 330, and a connecting element 340. The base 310 may be affixed on the optical element 400. Since optical element 400 may be affixed in the movable portion 130, the base 310 may be disposed on the movable portion 130. The movable element 320 may be used for connecting to a light control element 350, such as a lens, an aperture, a shutter, or a light filter, and the movable element 320 may move relative to the base 310. The driving element 330 may be disposed on the base 310 and the movable element 320 to drive the movable element 320 to move relative to the base 310. In other words, the driving element 330 may be used for driving the movable element 320 to move relative to the fixed portion 510 and the movable portion 130.

In some embodiments, the optical element 400 may include a lens barrel 410 and a lens 420. The material of the lens barrel 410 may include plastic, and the lens 420 may be affixed in the lens barrel 410 and may be transparent, such as may include transparent plastic or glass. The base 310 may be affixed on the lens barrel 410. In some embodiments, the base 310 may include a 312, the lens barrel 410 may include a lens barrel surface 412, the 312 and the lens barrel surface 412 may be parallel, and a gap is between the 312 and the lens barrel surface 412. Therefore, additional adhesive element (e.g. glue) may be disposed in the gap to fix the relative position of the lens barrel 410 and the base 310. It should be noted that the optical unit 300 and the fixed portion 510 are not in direct connect with each other.

In some embodiments, the driving element 330 of the optical unit 300 may be electrically connected to the fourth circuit element 170. For example, as shown in FIG. 1A, FIG. 1C, and FIG. 7A, the fourth circuit element 170 may include a seventh contact 267, and the seventh contact 267 may expose from the case 110 and does not overlap the first top wall 111 when viewed along the main axis O. Therefore, the driving element 330 disposed above the case 110 may electrically connect to the seventh contact 267. It should be noted that the third circuit element 160 may be used for providing energy that the operation of the driving assembly 140 requires, and the fourth circuit element 170 may be used for providing energy that the operation of the driving element 330 requires. In other words, the driving assembly 140 and the driving element 330 may be controlled through different circuits to prevent interference between the signals, so the performance may be enhanced.

Figure 9:
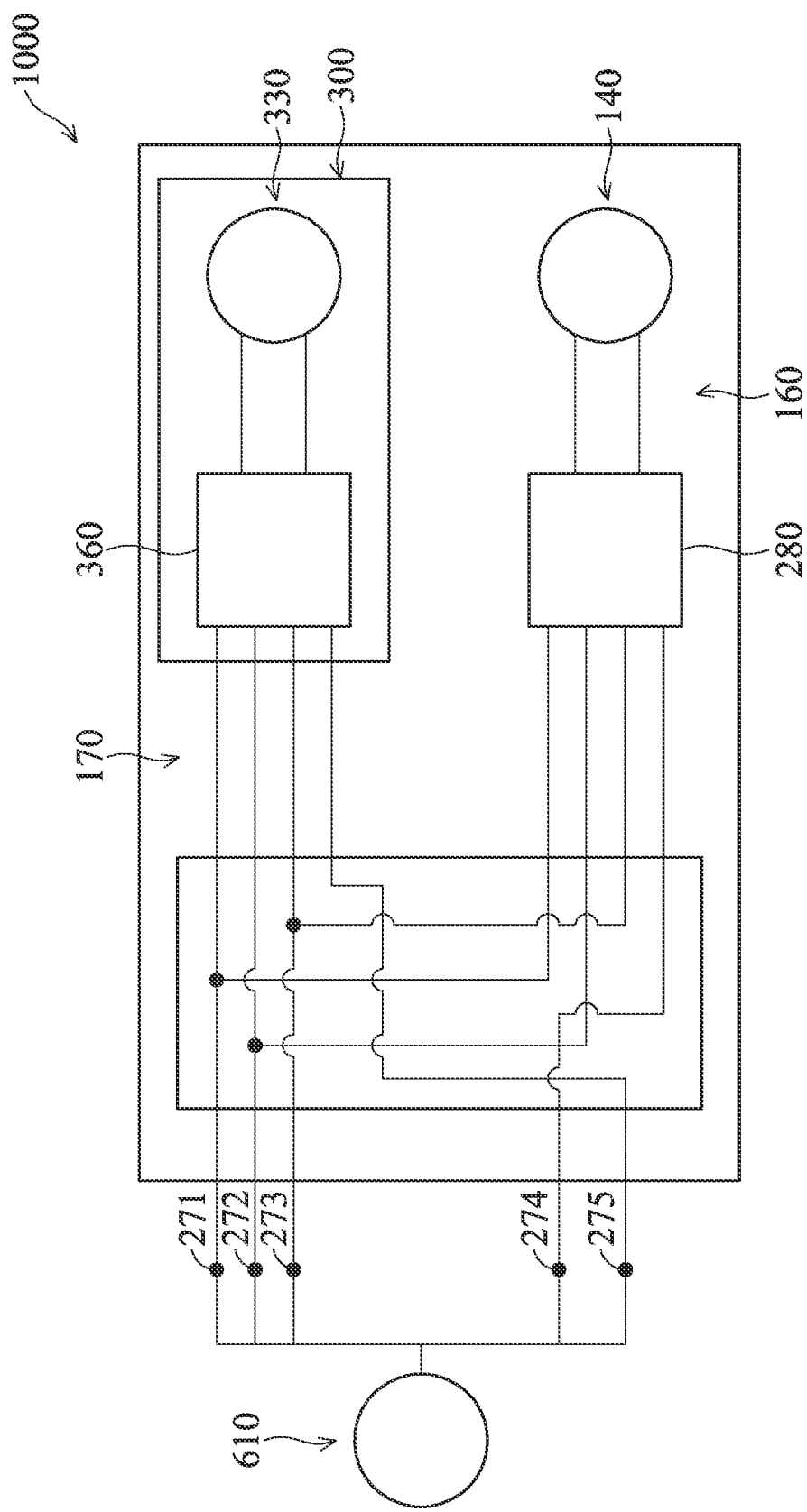
FIG. 9 is a schematic view of the circuits of the optical element driving mechanism.

In some embodiments, as shown in FIG. 3A and FIG. 6A, the first circuit element 180 may further include an external contact 271, an external contact 272, an external contact 273, an external contact 274, and an external contact 275 used for connecting to the external circuit (e.g. the external circuit 610 shown below). FIG. 9 is a schematic view of the circuits of the optical element driving mechanism 1000. The external contact 271, the external contact 272, and the external contact 273 may be electrically connected to the driving assembly 140 and the driving element 330. The external contact 274 may be electrically connected to the driving assembly 140, and may be electrically isolated from the optical unit 300 (e.g. the driving element 330). The external contact 275 may be electrically connected to the driving element 330, and may be electrically isolated from the driving assembly 140.

For example, the external contact 271, the external contact 272, the external contact 273, and the external contact 274 may be electrically connected to an integrated circuit element 280, and then connected to the driving assembly 140 through the third circuit element 160 to provide signal for the driving assembly 140. In some embodiments, the integrated circuit element 280 and the sensing element 201 may be integrated together or may adjacent each other, such as may position at an identical side of the optical element driving mechanism 1000, to achieve miniaturization.

The external contact 271, the external contact 272, the external contact 273, and the external contact 275 may be electrically connected to an integrated circuit element 360 through the fourth circuit element 170, and then the integrated circuit element 360 is electrically connected to the driving element 330 to provide the signal to the driving element 330.

In some embodiments, the external circuit 610 may provide a first signal to the external contact 274, and the first signal includes alternating voltage or current. The external circuit 610 may provide a second signal to the external contact 271 (or the external contact 272 and the external contact 273), and the second signal includes constant voltage or current. Moreover, the external circuit 610 may provide a third signal to the external contact 275, and the third signal includes alternating voltage or current. Therefore, the driving assembly 140 or the driving element 330 may be controlled by controlling the voltage or the current to the external contact 274 or the external contact 275, so interference between the signals may be prevented.

In some embodiments, if the gravity center of the movable portion 130 is not at the center of the movable portion 130, the movable portion 130 may flip after installing the movable portion 130 on the fixed portion 510. To avoid such situation, the third circuit element 160 or the fourth circuit element 170 may be designed to deform after being installed on the movable portion 130 to provide a force toward specific directions to the movable portion 130, so the flip caused by gravity force may be compensated. Therefore, the final position of the movable portion 130 may be closer to the center of the optical element driving mechanism 1000, and the quality of the image gained may be enhanced. For example, the center of the third circuit element 160 or the fourth circuit element 170 may be off-center relative to the main axis O, such as the main axis O may not pass through the center of the third circuit element 160 or the fourth circuit element 170.

For example, in some embodiments, as shown in FIG. 3C, a first positioning structure 701, a third positioning structure 703, a fifth positioning structure 705, and a seventh positioning structure 707 may position at the movable portion 130, and a second positioning structure 702, a fourth positioning structure 704, a sixth positioning structure 706, and a eighth positioning structure 708 may position at the bottom 120 of the fixed portion 510. The first positioning structure 701 may correspond to the second positioning structure 702, the third positioning structure 703 may correspond to the fourth positioning structure 704, the fifth positioning structure 705 may correspond to the sixth positioning structure 706, and the seventh positioning structure 707 may correspond to the eighth positioning structure 708, such as may position at identical sides or corners. It should be noted that although embodiments that the position structures being at the corners of the optical element driving mechanism 1000 are shown in FIG. 3C, the position structures may position at the sides of the optical element driving mechanism 1000 in other embodiments.

In some embodiments, the third circuit element 160 may include a first positioning portion 711, a second positioning portion 712, a third positioning portion 713, a fourth positioning portion 714, a fifth positioning portion 715, a sixth positioning portion 716, a seventh positioning portion 717, and a eighth positioning portion 718 corresponding to the first positioning structure 701, the second positioning structure 702, the third positioning structure 703, the fourth positioning structure 704, the fifth positioning structure 705, the sixth positioning structure 706, the seventh positioning structure 707, and the eighth positioning structure 708, respectively.

For example, when viewed along the main axis O, the first positioning portion 711, the second positioning portion 712, the third positioning portion 713, the fourth positioning portion 714, the fifth positioning portion 715, the sixth positioning portion 716, the seventh positioning portion 717, and the eighth positioning portion 718 may at least partially overlap the first positioning structure 701, the second positioning structure 702, the third positioning structure 703, the fourth positioning structure 704, the fifth positioning structure 705, the sixth positioning structure 706, the seventh positioning structure 707, and the eighth positioning structure 708, respectively. The first positioning portion 711, the second positioning portion 712, the third positioning portion 713, the fourth positioning portion 714, the fifth positioning portion 715, the sixth positioning portion 716, the seventh positioning portion 717, and the eighth positioning portion 718 may be disposed on the first positioning structure 701, the second positioning structure 702, the third positioning structure 703, the fourth positioning structure 704, the fifth positioning structure 705, the sixth positioning structure 706, the seventh positioning structure 707, and the eighth positioning structure 708, respectively to allow the third circuit element 160 movably connected to the movable portion 130 and the fixed portion 510.

In some embodiments, a first adhesive structure 721, a second adhesive structure 722, a third adhesive structure 723, a fourth adhesive structure 724, a fifth adhesive structure 725, a sixth adhesive structure 726, a seventh adhesive structure 727, and a eighth adhesive structure 728 may be disposed on the first positioning structure 701, the second positioning structure 702, the third positioning structure 703, the fourth positioning structure 704, the fifth positioning structure 705, the sixth positioning structure 706, the seventh positioning structure 707, and the eighth positioning structure 708, respectively, to connect the bottom 120, the movable portion 130, and the third circuit element 160. The first adhesive structure 721, the second adhesive structure 722, the third adhesive structure 723, the fourth adhesive structure 724, the fifth adhesive structure 725, the sixth adhesive structure 726, the seventh adhesive structure 727, and the eighth adhesive structure 728 may be glue.

Figure 10A:
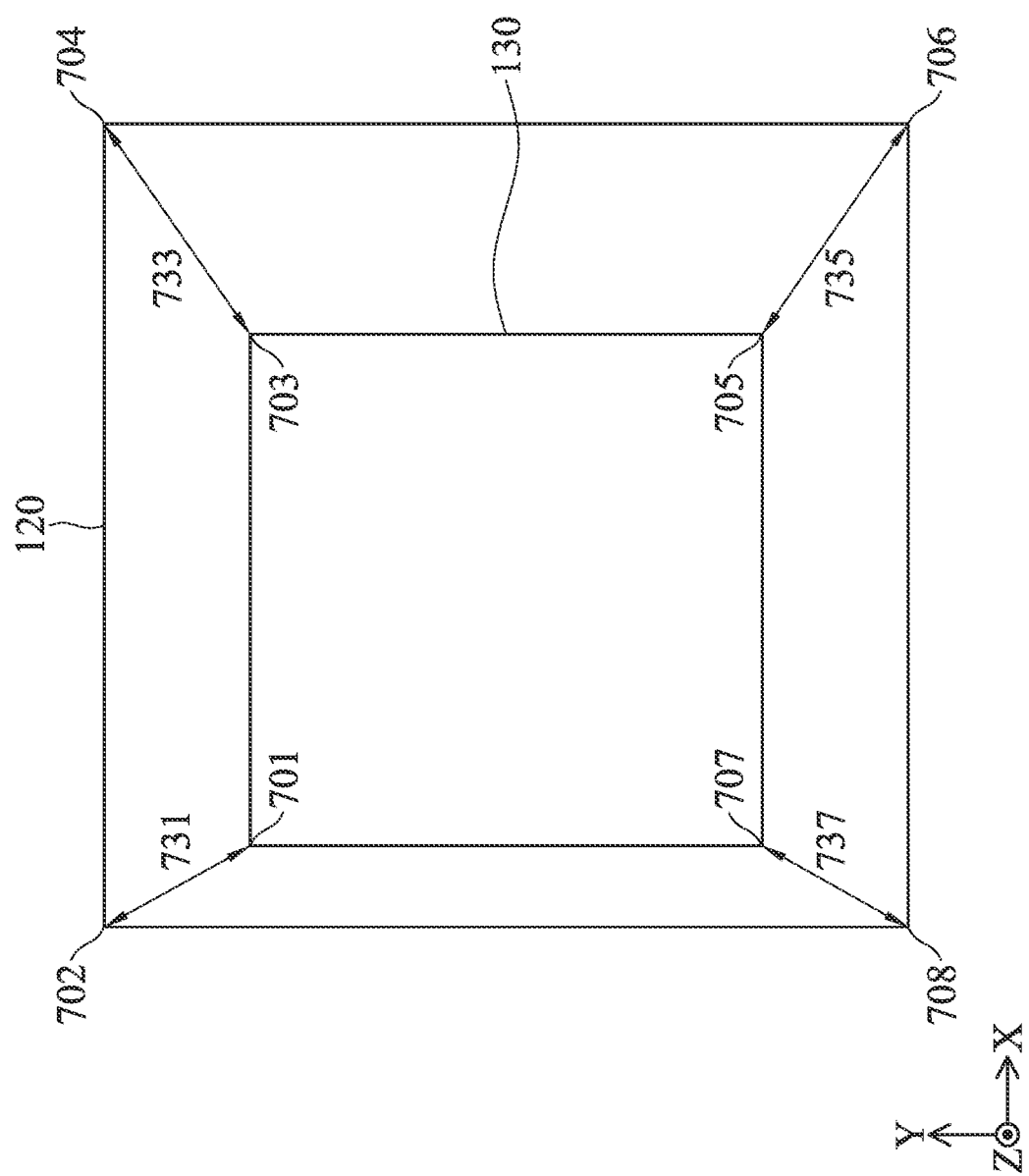
FIG. 10A and FIG. 10B are schematic views of the bottom and the movable portion before the third circuit element (or the fourth circuit element) is disposed on the bottom and the movable portion.
Figure 10B:
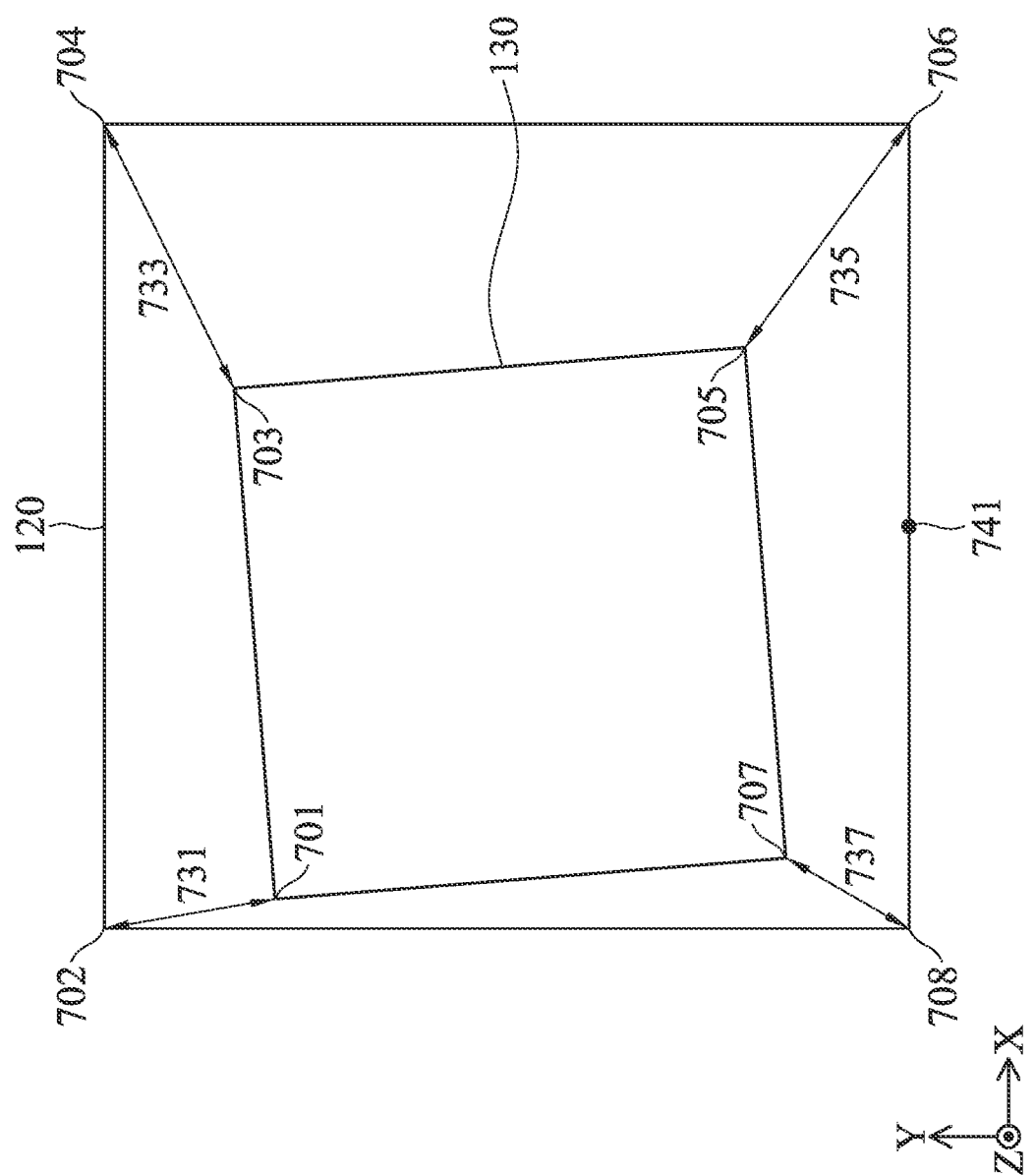
Figure 10C:
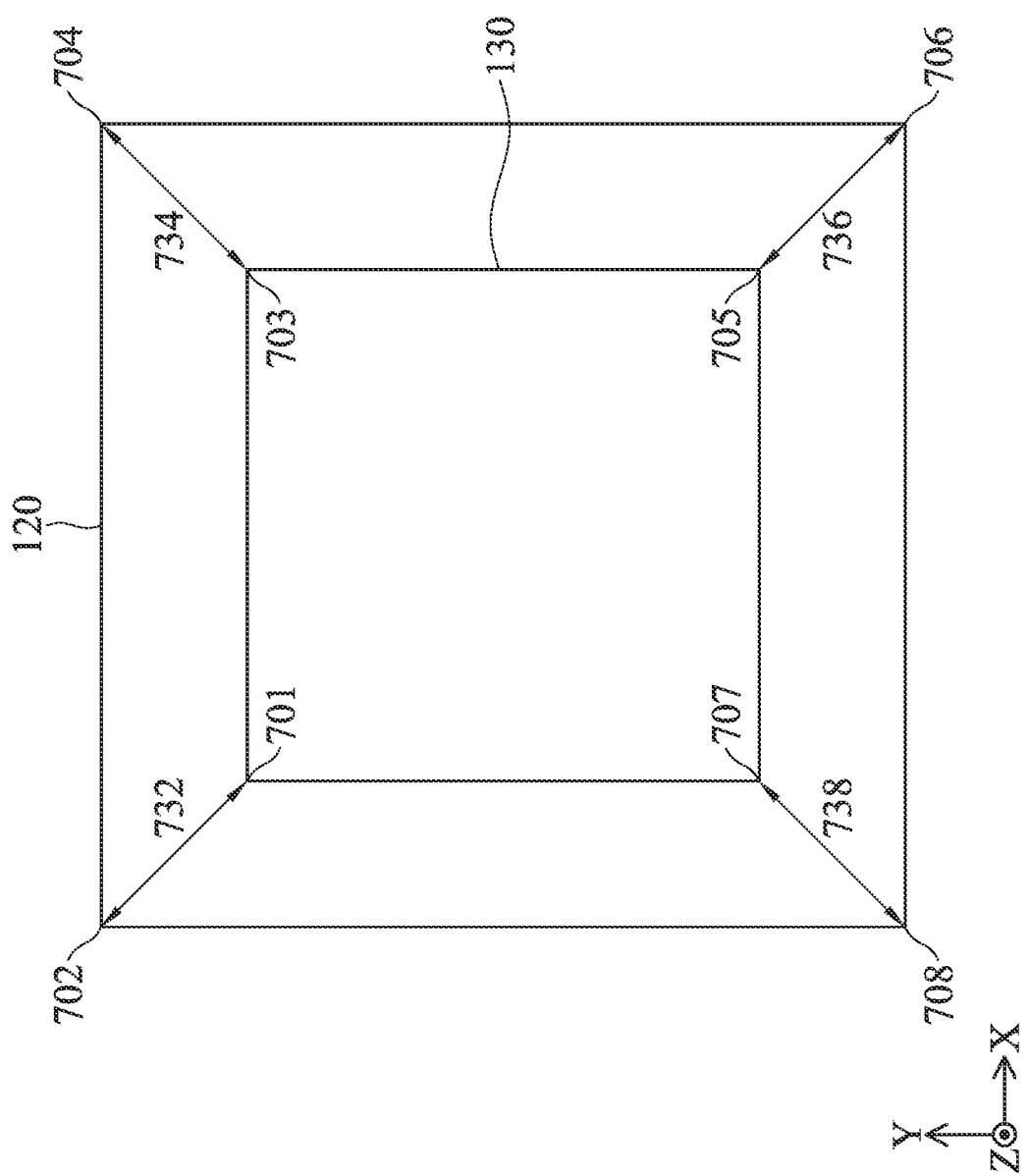
FIG. 10C is a schematic view of the bottom and the movable portion after the third circuit element (or the fourth circuit element) is disposed on the bottom and the movable portion.

FIG. 10A and FIG. 10B are schematic views of the bottom 120 and the movable portion 130 before the third circuit element 160 (or the fourth circuit element 170) is disposed on the bottom 120 and the movable portion 130, wherein the movable portion 130 flips relative to the bottom 120. FIG. 10C is a schematic view of the bottom 120 and the movable portion 130 after the third circuit element 160 (or the fourth circuit element 170) is disposed on the bottom 120 and the movable portion 130, wherein the third circuit element 160 or the fourth circuit element 170 are omitted in FIG. 10A, FIG. 10B, and FIG. 10C for simplicity. As shown in FIG. 10A to FIG. 10C, the position structures are at the corners. It should be noted that it is only for illustration, and the positions of the position structures may change based on actual requirement.

As shown in FIG. 10A, the movable portion 130 flips or moves relative to the bottom 120 in the −Y direction. In such situation, a first gap 731 is between the first positioning structure 701 and the second positioning structure 702, a third gap 733 is between the third positioning structure 703 and the fourth positioning structure 704, a fifth gap 735 is between the fifth positioning structure 705 and the sixth positioning structure 706, and a seventh gap 737 is between the seventh positioning structure 707 and the eighth positioning structure 708.

As shown in FIG. 10C, after the third circuit element 160 is disposed on the movable portion 130, the position of the movable portion 130 is affected by the third circuit element 160, and then comes close to the center of the optical element driving mechanism 1000. At this moment, a second gap 732 is between the first positioning structure 701 and the second positioning structure 702, a fourth gap 734 is between the sixth positioning structure 706 and the fourth positioning structure 704, a sixth gap 736 is between the fifth positioning structure 705 and the sixth positioning structure 706, and a eighth gap 738 is between the seventh positioning structure 707 and the eighth positioning structure 708.

In some embodiments, a first difference is between the first gap 731 and the second gap 732, a second difference is between the third gap 733 and the fourth gap 734, a third difference is between the fifth gap 735 and the sixth gap 736, and a fourth difference is between the seventh gap 737 and the eighth gap 738. It should be noted that in such embodiment, the first difference is less than the second difference, the first difference is less than the third difference, the first difference equals to the fourth difference, and the second difference equals to the third difference. Therefore, the movable portion 130 may be moved to the center of the optical element driving mechanism 1000 by the third circuit element 160 (or the fourth circuit element 170) to enhance the performance.

As shown in FIG. 10B, the movable portion 130 rotates relative to the bottom 120 with a rotational axis passing through the middle point of a side of the bottom 120 (e.g. the middle point 741 in FIG. 10B). In such condition, a first difference is between the first gap 731 and the second gap 732, a second difference is between the third gap 733 and the fourth gap 734, a third difference is between the fifth gap 735 and the sixth gap 736, and a fourth difference is between the seventh gap 737 and the eighth gap 738. The first difference is less than the second difference, the first difference is less than the third difference, the first difference is less than the fourth difference, the second difference is greater than the third difference, the second difference is greater than the fourth difference, and the third difference is greater than the fourth difference. Therefore, the movable portion 130 may be moved to the center of the optical element driving mechanism 1000 by the third circuit element 160 (or the fourth circuit element 170) to enhance the performance. In some embodiments, the middle point 741 and the position sensing assembly 200 may at different sides of the bottom 120 to prevent interference.

Figure 10D:
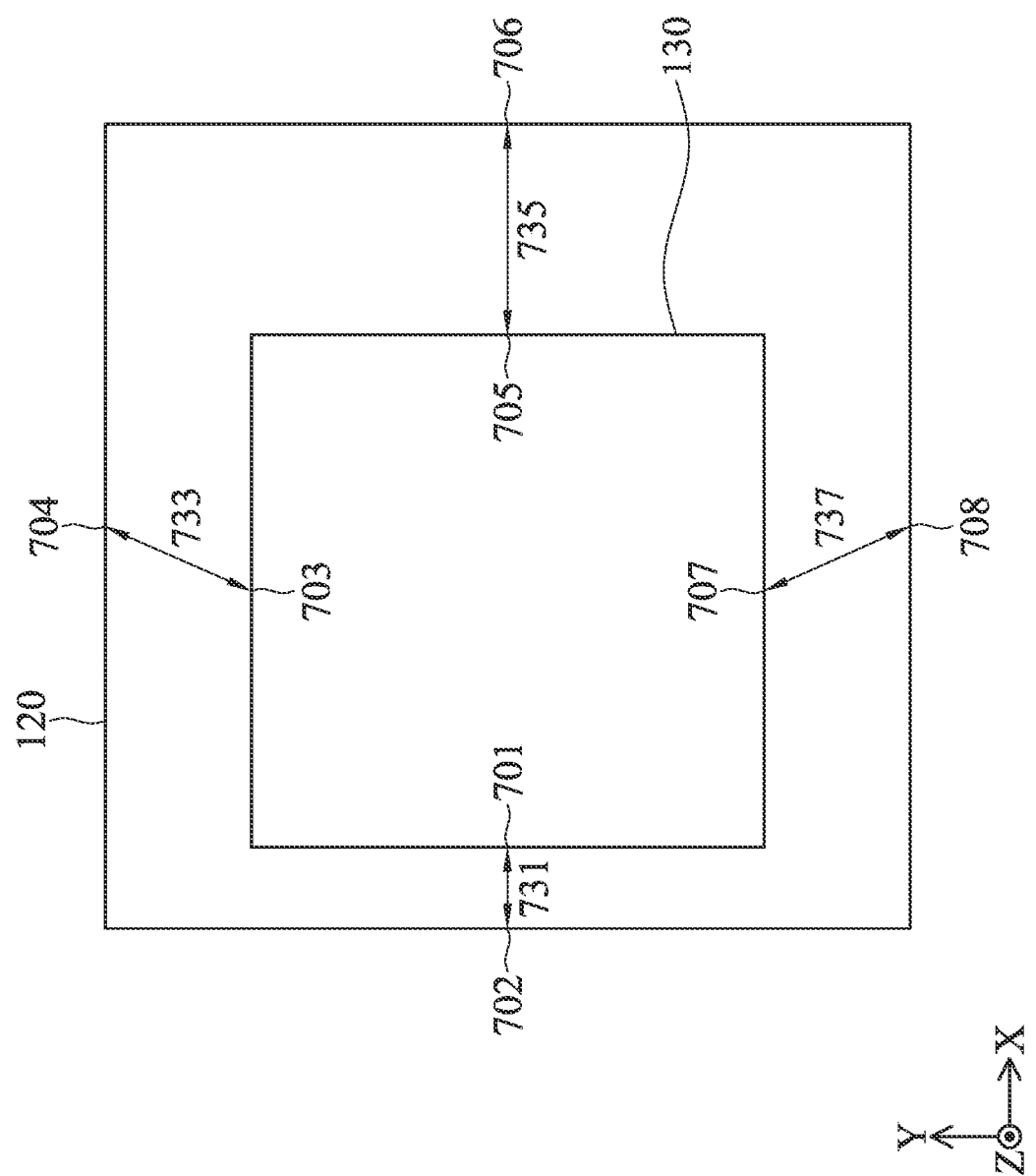
FIG. 10D and FIG. 10E are schematic views of the bottom and the movable portion before the third circuit element (or the fourth circuit element) is disposed on the bottom and the movable portion.
Figure 10E:
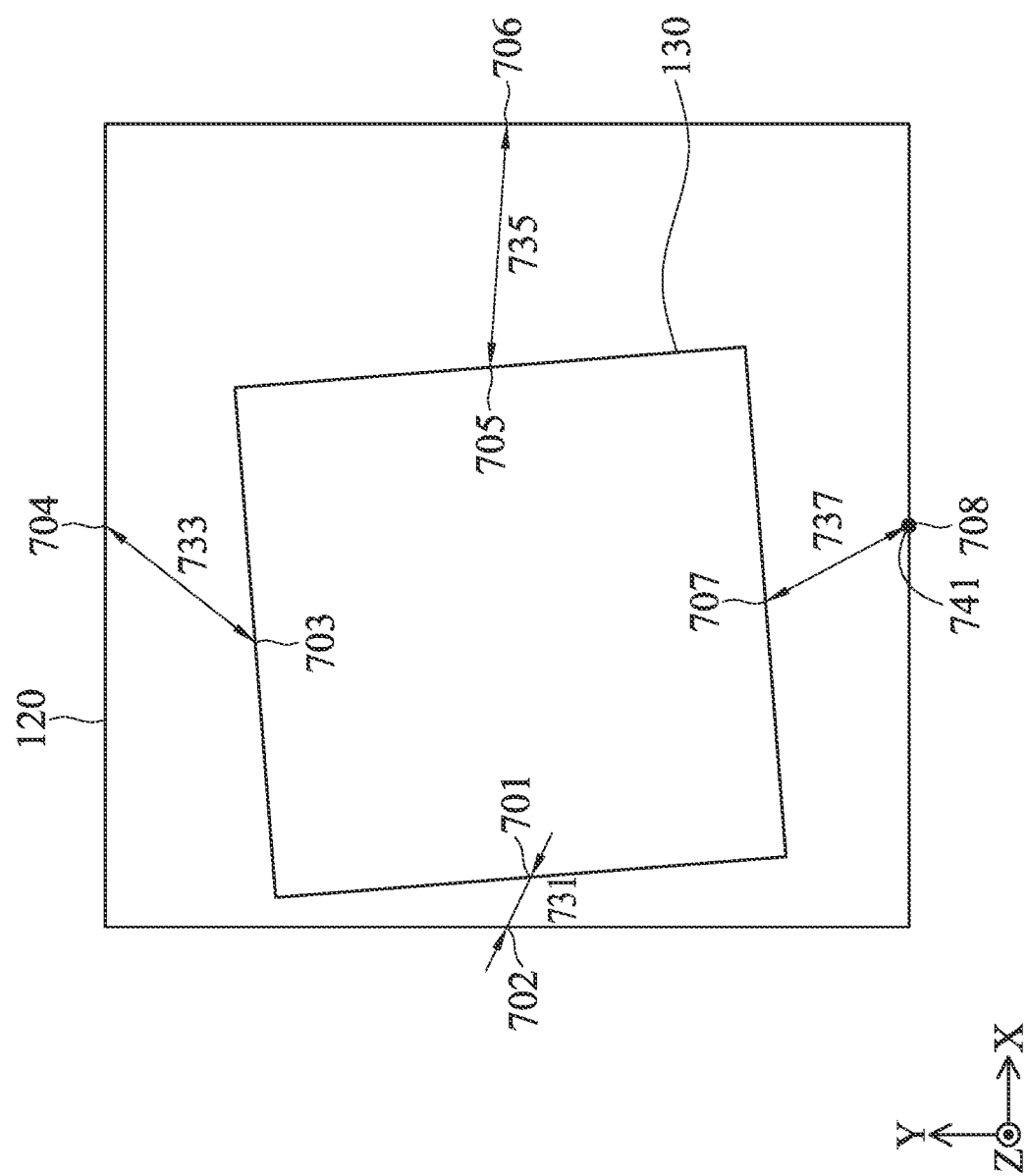
Figure 10F:
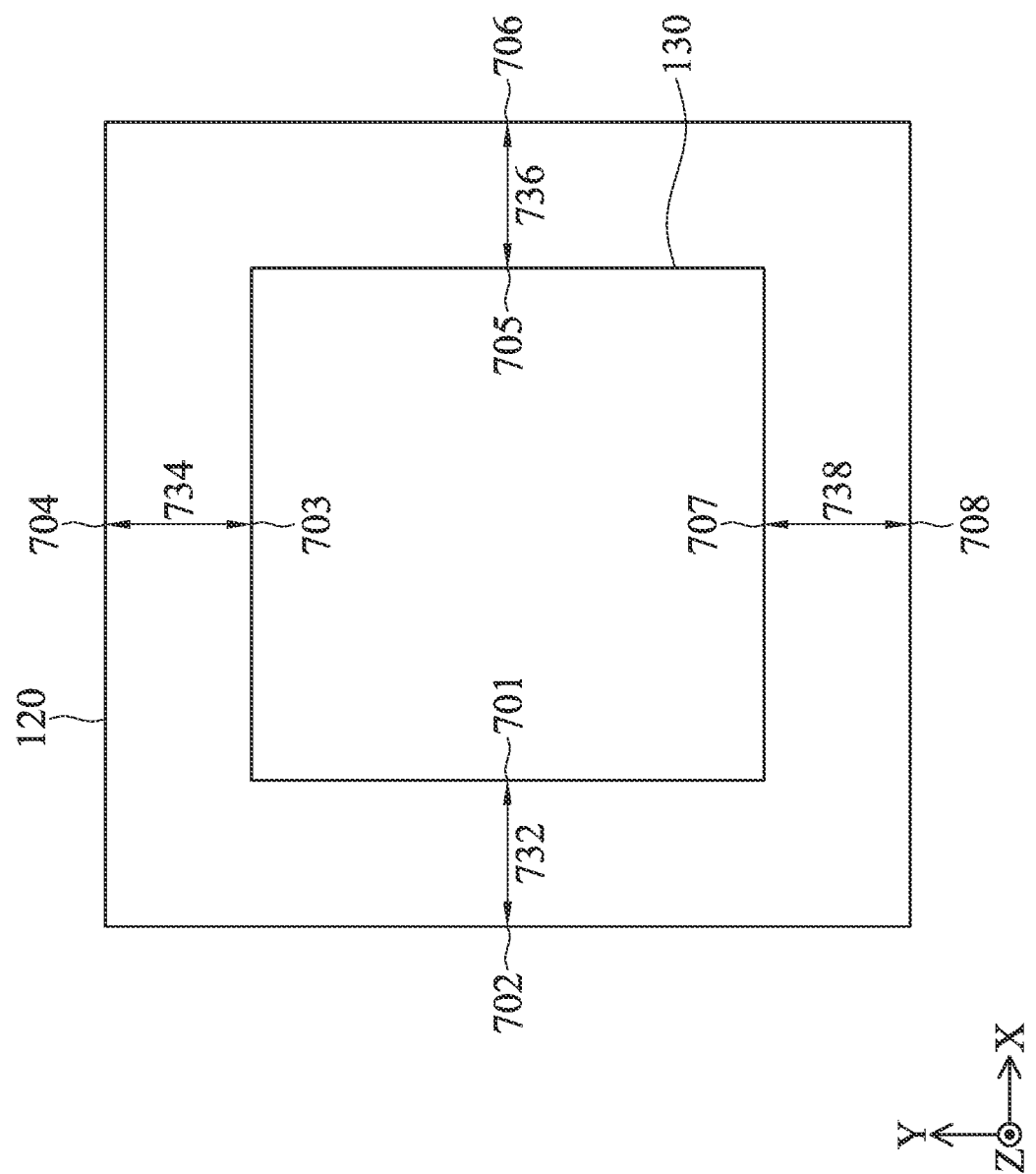
FIG. 10F is a schematic view of the bottom and the movable portion after the third circuit element (or the fourth circuit element) is disposed on the bottom and the movable portion.

FIG. 10D and FIG. 10E are schematic views of the bottom 120 and the movable portion 130 before the third circuit element 160 (or the fourth circuit element 170) is disposed on the bottom 120 and the movable portion 130, wherein the movable portion 130 flips relative to the bottom 120. FIG. 10F is a schematic view of the bottom 120 and the movable portion 130 after the third circuit element 160 (or the fourth circuit element 170) is disposed on the bottom 120 and the movable portion 130, wherein the third circuit element 160 or the fourth circuit element 170 are omitted in FIG. 10D, FIG. 10E, and FIG. 10F for simplicity. As shown in FIG. 10D to FIG. 10F, the position structures are at the sides. It should be noted that it is only for illustration, and the positions of the position structures may change based on actual requirement.

As shown in FIG. 10D, the movable portion 130 flips or moves relative to the bottom 120 in the −Y direction. In such situation, a first gap 731 is between the first positioning structure 701 and the second positioning structure 702, a third gap 733 is between the third positioning structure 703 and the fourth positioning structure 704, a fifth gap 735 is between the fifth positioning structure 705 and the sixth positioning structure 706, and a seventh gap 737 is between the seventh positioning structure 707 and the eighth positioning structure 708.

As shown in FIG. 10F, after the third circuit element 160 is disposed on the movable portion 130, the position of the movable portion 130 is affected by the third circuit element 160, and then comes close to the center of the optical element driving mechanism 1000. At this moment, a second gap 732 is between the first positioning structure 701 and the second positioning structure 702, a fourth gap 734 is between the sixth positioning structure 706 and the fourth positioning structure 704, a sixth gap 736 is between the fifth positioning structure 705 and the sixth positioning structure 706, and a eighth gap 738 is between the seventh positioning structure 707 and the eighth positioning structure 708.

In some embodiments, a first difference is between the first gap 731 and the second gap 732, a second difference is between the third gap 733 and the fourth gap 734, a third difference is between the fifth gap 735 and the sixth gap 736, and a fourth difference is between the seventh gap 737 and the eighth gap 738. It should be noted that in such embodiment, the first difference is greater than the second difference, the first difference equals to the third difference, the first difference is greater than the fourth difference, and the second difference equals to the fourth difference. Therefore, the movable portion 130 may be moved to the center of the optical element driving mechanism 1000 by the third circuit element 160 (or the fourth circuit element 170) to enhance the performance.

As shown in FIG. 10E, the movable portion 130 rotates relative to the bottom 120 with a rotational axis passing through the middle point of a side of the bottom 120 (e.g. the middle point 741 in FIG. 10E). In such condition, a first difference is between the first gap 731 and the second gap 732, a second difference is between the third gap 733 and the fourth gap 734, a third difference is between the fifth gap 735 and the sixth gap 736, and a fourth difference is between the seventh gap 737 and the eighth gap 738. The first difference is greater than the second difference, the first difference is less than the third difference, the first difference is greater than the fourth difference, the second difference is less than the third difference, the second difference is greater than the fourth difference, and the third difference is greater than the fourth difference. Therefore, the movable portion 130 may be moved to the center of the optical element driving mechanism 1000 by the third circuit element 160 (or the fourth circuit element 170) to enhance the performance. In some embodiments, the middle point 741 and the position sensing assembly 200 may at different sides of the bottom 120 to prevent interference.

Although FIG. 10A to FIG. 10F only show translational movement or rotation embodiments, the present disclosure is not limited thereto. For example, the third circuit element 160 or the fourth circuit element 170 may be designed to allow the movable portion 130 may perform translational movement and rotation relative to the bottom 120, such as by changing the position of the first positioning portion 711, the second positioning portion 712, the third positioning portion 713, the fourth positioning portion 714, the fifth positioning portion 715, the sixth positioning portion 716, the seventh positioning portion 717, or the fifth positioning portion 715. Therefore, the initial position of the movable portion 130 relative to the bottom 120 may be adjusted to enhance the photographing quality.

In summary, an optical element driving mechanism is provided in some embodiments of the present disclosure. The optical element driving mechanism includes a movable portion, a fixed portion, a driving assembly, and a circuit assembly. The movable portion is used for connecting to a first optical element. The movable portion is movable relative to the fixed portion. The driving assembly is used for driving the movable portion to move relative to the fixed portion. The circuit assembly is electrically connected to the driving assembly. The driving assembly is electrically connected to an external circuit through the circuit assembly. Therefore, the connection between the circuits may be enhanced to prevent interference between the signals, and may achieve miniaturization.

The relative positions and size relationship of the elements in the present disclosure may allow the optical element driving mechanism achieving miniaturization in specific directions or for the entire mechanism. Moreover, different optical modules may be combined with the optical element driving mechanism to further enhance optical quality, such as the quality of photographing or accuracy of depth detection. Therefore, the optical modules may be further utilized to achieve multiple anti-vibration systems, so image stabilization may be significantly improved.

Although embodiments of the present disclosure and their advantages already have been described in detail, it should be understood that various changes, substitutions and alterations may be made herein without departing from the spirit and the scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are also intended to include within their scope of such processes, machines, manufacture, and compositions of matter, means, methods, or steps. In addition, each claim herein constitutes a separate embodiment, and the combination of various claims and embodiments are also within the scope of the disclosure.

What is claimed is:

1. An optical element driving mechanism, comprising:
a movable portion used for connecting to an optical element, wherein the movable portion comprises a first positioning structure;
a fixed portion comprising a second positioning structure corresponding to the first positioning structure, wherein the movable portion is movable relative to the fixed portion;
a driving assembly used for driving the movable portion to move relative to the fixed portion; and
a circuit assembly electrically connected to the driving assembly and comprises a third circuit element, wherein the third circuit element comprises a first positioning portion and a second positioning portion connected to the movable portion and the fixed portion through the first positioning structure and the second positioning structure, respectively;
wherein the driving assembly is electrically connected to an external circuit through the circuit assembly;
when viewed along the main axis, and before the third circuit element is disposed on the movable portion and the fixed portion, a first gap is between the first positioning structure and the second positioning structure;
when viewed along the main axis, and after the third circuit element is disposed on the movable portion and the fixed portion, a second gap is between the first positioning structure and the second positioning structure;
the first gap and the second gap are different and have a first difference.

2. The optical element driving mechanism as claimed in claim 1, wherein the fixed portion further comprises:
a case comprising a first top wall and a first side wall;
a bottom, wherein the bottom and the case form an accommodating space, and the movable portion is disposed in the accommodating space; and
a frame, wherein the material of the frame comprises metal;
wherein:
the first top wall is perpendicular to a main axis;
the material of the case comprises metal;
the materials of the case and the frame are different;
the frame is disposed in the accommodating space;
the magnetic conductivity of the frame is higher than the magnetic conductivity of the case;
the frame comprises a second top wall and a second side wall;
the first top wall and the second top wall are parallel;
the first side wall and the second side wall are parallel;
the case further comprises a first bending portion, and the first top wall connects to the first side wall through the first bending portion;
the frame further comprises a second bending portion, and the second top wall connects to the second side wall through the first bending portion;
a first opening is formed between the second top wall and the second side wall;
a second opening is formed between the second top wall and the second side wall;
the second bending portion is between the first opening and the second opening;
when viewed along the main axis, the optical element driving mechanism is polygonal, and the first side wall is at a first side of the optical element driving mechanism;
when viewed along the main axis, the second side wall is at the first side;
when viewed along the main axis, the second top wall is at the first side;
a shortest distance between the first top wall and the second top wall is greater than a shortest distance between the first side wall and the second side wall;
when viewed along the main axis, at least a portion of the first bending portion overlaps the first opening;
when viewed along the main axis, at least a portion of the first bending portion overlaps the second opening.

3. The optical element driving mechanism as claimed in claim 2, wherein the driving assembly comprises:
a first magnetic element; and
a first coil corresponding to the first magnetic element;
wherein:
when viewed along the main axis, the first magnetic element is at the first side;
the first magnetic element is affixed on the second side wall;
the first magnetic element protrudes from the second side wall.

4. The optical element driving mechanism as claimed in claim 3, further comprising:
a first damping element used for absorbing abnormal vibration of the movable portion relative to the fixed portion; and
a second damping element used for absorbing abnormal vibration of the movable portion relative to the fixed portion;
when viewed along the main axis, the optical element driving mechanism further includes:
a second side adjacent to the first side; and
a third side adjacent to the first side;
the fixed portion further comprises:
a first edge position at the first side;
a second edge position at the second side;
a third edge position at the third side;
wherein:
the material of the first damping element comprises nonmetal material;
the material of the second damping element comprises nonmetal material;
the first side and the second side extend in directions that are perpendicular;
the first side and the third side extend in directions that are perpendicular;
when viewed along the main axis, a shortest distance between the first damping element and the second edge is different from a shortest distance between the first damping element and the first edge;
when viewed along the main axis, a shortest distance between the second damping element and the third edge is different from a shortest distance between the second damping element and the first edge.

5. The optical element driving mechanism as claimed in claim 4, wherein the fixed portion further comprises:
a first blocking wall extending along the main axis;
a first stopping surface used for limiting the movement of the movable portion relative to the fixed portion;
a first adhesive element, wherein the case is affixed on the bottom by the first adhesive element; and
a first connect reinforcement structure used for reinforcing the adhesion of the first adhesive element;
wherein:
when viewed along the main axis, the first blocking wall is at the second side;

the first damping element is disposed on the first blocking wall;
the first stopping surface is at the first blocking wall;
the first blocking wall and the bottom are formed as one piece;
the first connect reinforcement structure is at the first blocking wall;
the first connect reinforcement structure is a recessed structure;
when viewed along the main axis, the shortest distance between the first damping element and the second edge is less than the shortest distance between the first damping element and the first edge;
when viewed along the main axis, the shortest distance between the second damping element and the third edge is less than the shortest distance between the second damping element and the first edge;
the material of the first damping element comprises resin, plastic, rubber, or silicone;
the material of the second damping element comprises resin, plastic, rubber, or silicone.

6. The optical element driving mechanism as claimed in claim 5, further comprising a position sensing assembly used for detecting the movement of the movable portion relative to the fixed portion;
wherein:
when viewed along the main axis, the position sensing assembly is at the second side;
the circuit assembly comprises a first circuit element electrically connected to the position sensing assembly;
when viewed along the main axis, the first circuit element is at the second side;
the first circuit element is affixed on the first blocking wall;
the first circuit element is plate-shaped;
the first blocking wall comprises:
 a first recess used for accommodating the position sensing assembly;
 a second recess used for accommodating the first circuit element; and
 a third recess used for accommodating a second adhesive element;
the first recess is in the second recess;
the first circuit element is affixed on the first blocking wall by the second adhesive element;
the third recess is in the second recess;
the depth of the first recess is greater than the depth of the third recess;
when viewed along the main axis, the position sensing assembly is at the center of the second side.

7. The optical element driving mechanism as claimed in claim 6, wherein the circuit assembly further comprises a second circuit element disposed on the bottom;
wherein:
the first circuit element comprises a first contact;
the second circuit element comprises a second contact;
the optical element driving mechanism further comprises a first electrical connecting element;
the first contact is electrically connected to the second contact by the first electrical connecting element;
the first electrical connecting element is in direct contact with a first surface of the first circuit element;
the first electrical connecting element is in direct contact with a second surface of the second circuit element;
the first surface and the second surface are not parallel;
when viewed along a first direction that is perpendicular to the main axis, the first surface at least partially overlaps the second surface in a second direction that is perpendicular to the main axis;
when viewed along the first direction, the first surface does not overlap a third surface of the second contact in the second direction;
the second surface and the third surface face opposite directions;
at least a portion of the second surface overlaps the third surface in the direction that the main axis extends.

8. The optical element driving mechanism as claimed in claim 7, wherein the third circuit element is electrically connected to the second circuit element;
wherein:
the movable portion is movable connected to the fixed portion through the third circuit element;
the driving assembly is electrically connected to the second circuit element through the third circuit element;
the third circuit element is plate-shaped;
the third circuit element further comprises a third contact and a fourth contact electrically connected to the second circuit element;
when viewed along the main axis, the third contact and the fourth contact are position at the diagonal of the optical element driving mechanism;
at least a portion of the second circuit element is embedded in the bottom and does not exposed from the bottom;
the first surface and the second surface are perpendicular.

9. The optical element driving mechanism as claimed in claim 8, wherein the circuit assembly further comprises a fourth circuit element electrically connected to the second circuit element;
wherein:
the movable portion is movably connected to the fixed portion through the fourth circuit element;
the fourth circuit element is plate-shaped;
the second circuit element comprises a fifth contact and a sixth contact electrically connected to the fourth circuit element;
when viewed along the main axis, the fifth contact and the sixth contact are position at the diagonal of the optical element driving mechanism;
the fifth contact is at the first blocking wall;
at least a portion of the second circuit is embedded in and does not exposed from the first blocking wall.

10. The optical element driving mechanism as claimed in claim 9, further comprising an optical unit used for adjusting light to the optical element, wherein the optical unit comprises:
a movable element used for connect to a light control unit;
a base, wherein the movable element is movable relative to the base;
a driving element used for driving the movable element to move relative to the base;
wherein:
the driving element is used for driving the movable element to move relative to the fixed portion and the movable portion;
the base is affixed on the movable portion;
the base is affixed to the optical element;
the optical element comprises:
a lens barrel, wherein the material of the lens barrel comprises plastic; and
a lens affixed in the lens barrel, and the material of the lens comprises transparent material;
the base is affixed on the lens barrel;

a base surface of the base faces the optical element;
a lens barrel surface of the lens barrel faces the base;
the base surface and the lens barrel surface are parallel;
a gap is between the base surface and the lens barrel surface;
the optical unit is affixed on the movable portion;
the optical unit is not in direct connect with the fixed portion;
the driving element is electrically connected to the fourth circuit element;
the fourth circuit element further comprises a seventh contact electrically connected to the driving assembly;
when viewed along the main axis, the seventh contact is exposed from the case;
when viewed along the main axis, the seventh contact does not overlap the first top wall.

11. The optical element driving mechanism as claimed in claim 10, wherein the circuit assembly further comprises:
a first external contact used for connecting to the external circuit;
a second external contact used for connecting to the external circuit;
the first external contact is electrically connected to the driving assembly;
the first external contact is electrical isolated from the optical unit;
the first external contact is electrical isolated from the driving element;
the second external contact is electrically connected to the driving assembly;
the second external contact is electrically connected to the driving element;
the external circuit provides a first signal to the first external contact, and the first signal comprises alternative voltage or current;
the external circuit provides a second signal to the second external contact, and the second signal comprises constant voltage or current.

12. The optical element driving mechanism as claimed in claim 11, wherein:
the optical element driving mechanism further comprises:
a first adhesive structure disposed on the first positioning structure; and
a second adhesive structure disposed on the second positioning structure.

13. The optical element driving mechanism as claimed in claim 12, wherein:
the movable portion further comprises a third positioning structure, a fifth positioning structure, and a seventh positioning structure;
the fixed portion further comprises a fourth positioning structure, a sixth positioning structure, and an eighth positioning structure;
the first positioning structure, the third positioning structure, the fifth positioning structure, and the seventh positioning structure correspond to the second positioning structure, the fourth positioning structure, the sixth positioning structure, and the eighth positioning structure, respectively;
the third circuit element further comprises a third positioning portion, a fourth positioning portion, a fifth positioning portion, a sixth positioning portion, a seventh positioning portion, and an eighth positioning portion corresponding to the third positioning structure, the fourth positioning structure, the fifth positioning structure, the sixth positioning structure, the seventh positioning structure, and the eighth positioning structure, respectively;
when viewed along the main axis, and before the third circuit element is disposed on the movable portion and the fixed portion, a third gap is between the third positioning structure and the fourth positioning structure;
when viewed along the main axis, and after the third circuit element is disposed on the movable portion and the fixed portion, a fourth gap is between the third positioning structure and the fourth positioning structure;
when viewed along the main axis, and before the third circuit element is disposed on the movable portion and the fixed portion, a fifth gap is between the fifth positioning structure and the sixth positioning structure;
when viewed along the main axis, and after the third circuit element is disposed on the movable portion and the fixed portion, a sixth gap is between the fifth positioning structure and the sixth positioning structure;
when viewed along the main axis, and before the third circuit element is disposed on the movable portion and the fixed portion, a seventh gap is between the seventh positioning structure and the eighth positioning structure;
when viewed along the main axis, and after the third circuit element is disposed on the movable portion and the fixed portion, an eighth gap is between the seventh positioning structure and the eighth positioning structure;
the third gap and the fourth gap are different and have a second difference;
the fifth gap and the sixth gap are different and have a third difference;
the seventh gap and the eighth gap are different and have a fourth difference.

14. The optical element driving mechanism as claimed in claim 13, wherein:
the first positioning structure, the third positioning structure, the fifth positioning structure, and the seventh positioning structure position at different corners of the optical element driving mechanism;
the second positioning structure, the fourth positioning structure, the sixth positioning structure, and the eighth positioning structure position at different corners of the optical element driving mechanism;
the first difference is less than the second difference;
the first difference is less than the third difference;
the first difference equals to the fourth difference;
the second difference equals to the third difference.

15. The optical element driving mechanism as claimed in claim 13, wherein:
the first positioning structure, the third positioning structure, the fifth positioning structure, and the seventh positioning structure position at different corners of the optical element driving mechanism;
the second positioning structure, the fourth positioning structure, the sixth positioning structure, and the eighth positioning structure position at different corners of the optical element driving mechanism;
the first difference is less than the second difference;
the first difference is less than the third difference;
the first difference is less than the fourth difference;
the second difference is greater than the third difference;

the second difference is greater than the fourth difference;
the third difference is greater than the fourth difference.

16. The optical element driving mechanism as claimed in claim 13, wherein:
- the first positioning structure, the third positioning structure, the fifth positioning structure, and the seventh positioning structure position at different sides of the optical element driving mechanism;
- the second positioning structure, the fourth positioning structure, the sixth positioning structure, and the eighth positioning structure position at different sides of the optical element driving mechanism;
- the first difference is greater than the second difference;
- the first difference equals to the third difference;
- the first difference is greater than the fourth difference;
- the second difference equals to the fourth difference.

17. The optical element driving mechanism as claimed in claim 13, wherein:
- the first positioning structure, the third positioning structure, the fifth positioning structure, and the seventh positioning structure position at different sides of the optical element driving mechanism;
- the second positioning structure, the fourth positioning structure, the sixth positioning structure, and the eighth positioning structure position at different sides of the optical element driving mechanism;
- the first difference is greater than the second difference;
- the first difference is less than the third difference;
- the first difference is greater than the fourth difference;
- the second difference is less than the third difference;
- the second difference is greater than the third difference;
- the second difference is greater than the fourth difference.

\* \* \* \* \*